US012766472B2

(12) United States Patent
Komazawa et al.

(10) Patent No.: US 12,766,472 B2
(45) Date of Patent: Oct. 20, 2026

(54) FLUID MIXING OUTPUT APPARATUS AND FLUID UTILIZATION APPARATUS USING THE SAME

(71) Applicant: SIO CO., LTD., Hachioji (JP)

(72) Inventors: Masuhiko Komazawa, Hachioji (JP); Masaru Ohki, Hachioji (JP); Shin Komazawa, Hachioji (JP)

(73) Assignee: SIO CO., LTD., Tokyo (JP)

(*) Notice: Subject to any disclaimer, the term of this patent is extended or adjusted under 35 U.S.C. 154(b) by 392 days.

(21) Appl. No.: 18/383,920

(22) Filed: Oct. 26, 2023

(65) Prior Publication Data

US 2024/0139696 A1 May 2, 2024

(30) Foreign Application Priority Data

Nov. 2, 2022 (JP) ................................. 2022-175967

(51) Int. Cl.
*B01F 25/00* (2022.01)
*B01F 23/232* (2022.01)
(Continued)

(52) U.S. Cl.
CPC ........ *B01F 25/4341* (2022.01); *B01F 23/232* (2022.01); *B01F 23/2373* (2022.01);
(Continued)

(58) Field of Classification Search
CPC ............. B01F 25/4341; B01F 23/2373; B29C 48/595; B29C 48/615
See application file for complete search history.

(56) References Cited

U.S. PATENT DOCUMENTS 5,728,337 A * 3/1998 Yoshikawa ............. B29C 48/40 264/102
6,386,466 B1 * 5/2002 Ozawa ................ H10P 72/0414 261/78.2

(Continued)

FOREIGN PATENT DOCUMENTS

JP 3410385 5/2003
JP 4088330 5/2008

(Continued)

*Primary Examiner* — Anshu Bhatia
(74) *Attorney, Agent, or Firm* — Amin, Turocy & Watson, LLP

(57) ABSTRACT

By homogeneously mixing a plurality of fluids, when mixing a gas with a liquid, it is possible to mix a large amount of gas into the liquid, so that large bubbles are not generated, and fine bubbles (in some cases, fine bubbles including microbubbles or ultra-fine bubbles) can be mixed into the liquid. A fluid mixing output apparatus of the present disclosure includes a housing and an internal structure accommodated in the housing. The housing is provided with a plurality of fluid supply ports for supplying at least a first fluid and a second fluid and a fluid outlet at its downstream end for outputting a plurality of fluids after mixing the plurality of fluids. The internal structure includes a first portion, a second portion, a third portion, and a fourth portion. The first portion includes a shaft portion and a vane spirally formed to generate a swirling flow in a fluid. The second portion is located downstream from the first portion, and includes a shaft portion and a plurality of protrusions protruding from an outer circumferential surface of the shaft portion. The third portion is located downstream from the second portion, and includes a shaft portion and a vane spirally formed to generate a swirling flow in a fluid. The fourth portion is located downstream from the third portion, and includes a shaft portion and a plurality of protrusions protruding from an outer circumferential surface of the shaft (Continued)

portion. One of the plurality of fluid supply ports of the housing is formed in a portion corresponding to the vane of the third portion, and the second fluid is supplied to the third portion and supplied to the fourth portion as a swirling flow while being mixed with the first fluid.

20 Claims, 13 Drawing Sheets

(51) Int. Cl.

| | |
|---|---|
| ***B01F 23/237*** | (2022.01) |
| ***B01F 23/2373*** | (2022.01) |
| ***B01F 25/10*** | (2022.01) |
| ***B01F 25/434*** | (2022.01) |
| ***B08B 3/02*** | (2006.01) |
| ***B08B 5/00*** | (2006.01) |
| ***B28C 5/02*** | (2006.01) |
| *B01F 101/24* | (2022.01) |
| *B01F 101/28* | (2022.01) |

(52) U.S. Cl.

CPC ........ *B01F 23/23762* (2022.01); *B01F 25/10* (2022.01); *B08B 3/02* (2013.01); *B08B 5/00* (2013.01); *B28C 5/02* (2013.01); *B01F 2101/24* (2022.01); *B01F 2101/28* (2022.01)

(56) References Cited

U.S. PATENT DOCUMENTS

| | | | |
|---|---|---|---|
| 7,803,230 | B2 | 9/2010 | Amai et al. |
| 10,509,029 | B2 | 12/2019 | Tamura |
| 11,000,865 | B2 | 5/2021 | Komazawa et al. |
| 2008/0302222 | A1 | 12/2008 | Yanagisawa |
| 2017/0291326 | A1* | 10/2017 | Christiano .............. B29C 48/53 |
| 2019/0091820 | A1* | 3/2019 | Komazawa ........ B23Q 11/1084 |

FOREIGN PATENT DOCUMENTS

| | | |
|---|---|---|
| JP | 2009-273966 | 11/2009 |
| JP | 4423289 | 3/2010 |
| JP | 2011-129741 | 6/2011 |
| JP | 2012-035166 | 2/2012 |
| JP | 5495299 | 5/2014 |
| JP | 2017-106709 | 6/2017 |
| JP | 6207366 | 10/2017 |
| JP | 6328493 | 5/2018 |
| JP | 6433039 | 12/2018 |
| JP | 2019-076886 | 5/2019 |
| JP | 6534058 | 6/2019 |
| JP | 2020-138106 | 9/2020 |
| JP | 2021-084068 | 6/2021 |
| JP | 7034503 | 3/2022 |

* cited by examiner

FLUID MIXING OUTPUT APPARATUS AND FLUID UTILIZATION APPARATUS USING THE SAME

CROSS-REFERENCE TO RELATED APPLICATION

This application claims the benefit of Japanese Patent Application No. 2022-175967 filed on Nov. 2, 2022, in the Japanese Patent Office, the entire disclosure of which is incorporated herein by reference for all purposes.

TECHNICAL FIELD

The present disclosure relates to a fluid mixing output apparatus for mixing and outputting a plurality of fluids and a fluid utilization apparatus using the same.

BACKGROUND ART

In various technical fields, a fluid mixing output apparatus for mixing and outputting a plurality of fluids is used. For example, there is a two-fluid nozzle that improves a cleaning effect by mixing a gas with a liquid and outputting it. Examples of such two-fluid nozzles include, for example, Japanese Patent No. 3410385 and Japanese Patent No. 6207366. In these examples, a gas and a liquid are mixed, and the mixed fluid is sprayed from the nozzle to be used to clean semiconductor wafers and the like. Further, in the field of machine tools, for the purpose of cooling while cleaning workpieces and knives, it is also practiced to spray a mixture of cooling water and air. In addition, fine bubbles are generated by mixing a gas with a liquid, and a liquid containing fine bubbles is used for cleaning, cooling, and other purposes. Examples of a fluid characteristic changing apparatus that generates ultra-fine bubbles in a fluid include Japanese Patent No. 6433039 and Patent No. 6534058 by the applicant of the present application.

PRIOR ART DOCUMENT

Patent Document (Patent Document 1) Japanese Patent No. 3410385
(Patent Document 2) Japanese Patent No. 6207366
(Patent Document 3) Japanese Patent No. 6433039
(Patent Document 4) Japanese Patent No. 6534058

SUMMARY OF INVENTION

Problem to be Solved by the Invention

According to the fluid mixing output apparatus according to the related art, the apparatus for mixing a plurality of fluids is often large, and it is difficult to mix the plurality of fluids appropriately, for example, homogeneously. Further, in the case of gas-liquid mixing, the particle size of the gas mixed in the liquid remained large, and the gas was not micronized.

The present disclosure has been made in view of such circumstances. An object of the present disclosure is to provide a fluid mixing output apparatus capable of micronizing and sufficiently mixing fluids using the prior inventions of the applicant of the present application for fluid mixing.

Means for Solving the Problem

The present disclosure has the following configuration in order to solve the above-described problems. In other words, according to an embodiment of the present disclosure, a fluid mixing output apparatus includes a housing and an internal structure accommodated in the housing. The housing is provided with a plurality of fluid supply ports for supplying at least a first fluid and a second fluid and a fluid outlet at its downstream end for outputting a plurality of fluids after mixing the plurality of fluids. The internal structure includes a first portion, a second portion, a third portion, and a fourth portion. The first portion includes a shaft portion and a vane spirally formed to generate a swirling flow in the fluid. The second portion is located downstream from the first portion and includes a shaft portion and a plurality of protrusions protruding from an outer circumferential surface of the shaft portion. The third portion is located downstream from the second portion, and includes a shaft portion and a spirally formed vane to generate a swirling flow in the fluid. The fourth portion is located downstream from the third portion, and includes a shaft portion and a plurality of protrusions protruding from an outer circumferential surface of the shaft portion.

One of the plurality of fluid supply ports of the housing is formed in a portion corresponding to the vane of the first portion, and the first fluid is supplied to the first portion and supplied to the second portion as a swirling flow, and one of the plurality of fluid supply ports of the housing is formed in a portion corresponding to the vane of the third portion, and the second fluid is supplied to the third portion and supplied to the fourth portion as a swirling flow while being mixed with at least the first fluid.

According to another embodiment of the present disclosure, one of the plurality of fluid supply ports of the housing is formed by opening an upstream end, and the first fluid is supplied from upstream to the first portion and supplied to the second portion as a swirling flow, and one of the plurality of fluid supply ports of the housing is formed in a portion corresponding to the vane of the third portion, and the second fluid is supplied to the third portion and supplied to the fourth portion as a swirling flow while being mixed with at least the first fluid.

According to another embodiment, one of the plurality of fluid supply ports of the housing is formed in a portion corresponding to the vane of the first portion, and the first fluid is supplied to the first portion and supplied to the second portion as a swirling flow, and one of the plurality of fluid supply ports of the housing is formed at an upstream end, and a fluid which is the same as or different from the first fluid is supplied from upstream to the first portion, and one of the plurality of fluid supply ports of the housing is formed in a portion corresponding to the vane of the third portion, and the second fluid is supplied to the third portion and supplied to the fourth portion as a swirling flow while being mixed with at least the first fluid.

According to another embodiment, one of the plurality of fluid supply ports of the housing is formed in a portion corresponding to the vane of the first portion, the first fluid is supplied to become a swirling flow and supplied to the second portion, and another one of the plurality of fluid supply ports is formed in a portion corresponding to the vane of the third portion, and the second fluid is supplied to the third portion and is supplied to the fourth portion while being mixed with the first fluid supplied from the second portion.

According to another embodiment, one of the plurality of fluid supply ports of the housing is an opening at an upstream end of the housing, the first fluid is supplied to the first portion, another one of the plurality of fluid supply ports is formed in a portion corresponding to the vane of the first portion of the housing, the second fluid is supplied and mixed with the first fluid to be supplied to the second portion as a swirling flow, and still another one of the plurality of fluid supply ports is formed in a portion corresponding to the vane of the third portion of the housing, and the third fluid is supplied to the third portion, further mixed with the mixed fluid of the first fluid and the second fluid supplied from the second portion, and supplied to the fourth portion as a swirling flow.

According to another embodiment, one of the plurality of fluid supply ports of the housing is an opening at an upstream end of the housing, the first fluid is supplied to become a swirling flow and supplied to the second portion, and another one of the plurality of fluid supply ports is formed in a portion corresponding to the vane of the third portion of the housing, and the second fluid is supplied to the third portion, mixed with the first fluid supplied from the second portion, and supplied to the fourth portion as a swirling flow.

A fluid utilization apparatus of the present disclosure is configured to supply a liquid to the first portion and a gas to the third portion, and output them in a state where the gas is mixed in the liquid from the fluid outlet of the housing to allow use in a gas-liquid mixed state.

Alternatively, a fluid utilization apparatus of the present disclosure is, for example, configured to supply a gas to the first portion and a liquid to the third portion, and output them in a state where the gas is mixed in the liquid from the fluid outlet of the housing to allow use in a gas-liquid mixed state.

Alternately, it is possible to use more fluids (liquids, gases, and mixed fluid thereof) in a state where they are appropriately or homogeneously, stirred, diffused, sheared, or mixed, and, in some cases, in a fine-bubbled state.

According to a fluid mixing output apparatus of the present disclosure, it is possible to appropriately mix a plurality of fluids. More specifically, according to the fluid mixing output apparatus of the present disclosure, it is possible to homogeneously mix a plurality of fluids. Further, when mixing a gas in a liquid, it is possible to mix a large amount of the gas in the liquid. In addition, without generating large bubbles, it is possible to mix the gas as minute bubbles (in some cases, fine bubbles including microbubbles or ultra-fine bubbles) into the liquid. Alternatively, a plurality of fluids may be mixed homogeneously.

In addition, according to a fluid utilization apparatus of the present disclosure, it is possible to utilize a homogeneously mixed fluid from a fluid mixing output apparatus. Alternatively, a fluid containing a gas that is fine-bubbled (either a microbubble state or an ultra-fine bubble state or both states) may be used.

BRIEF DESCRIPTION OF DRAWINGS

When the following detailed description is considered in conjunction with the following drawings, a deeper understanding of the present disclosure can be obtained. These drawings are illustrative only and do not limit the scope of the present disclosure.

DESCRIPTION OF EMBODIMENTS

Figure 1:
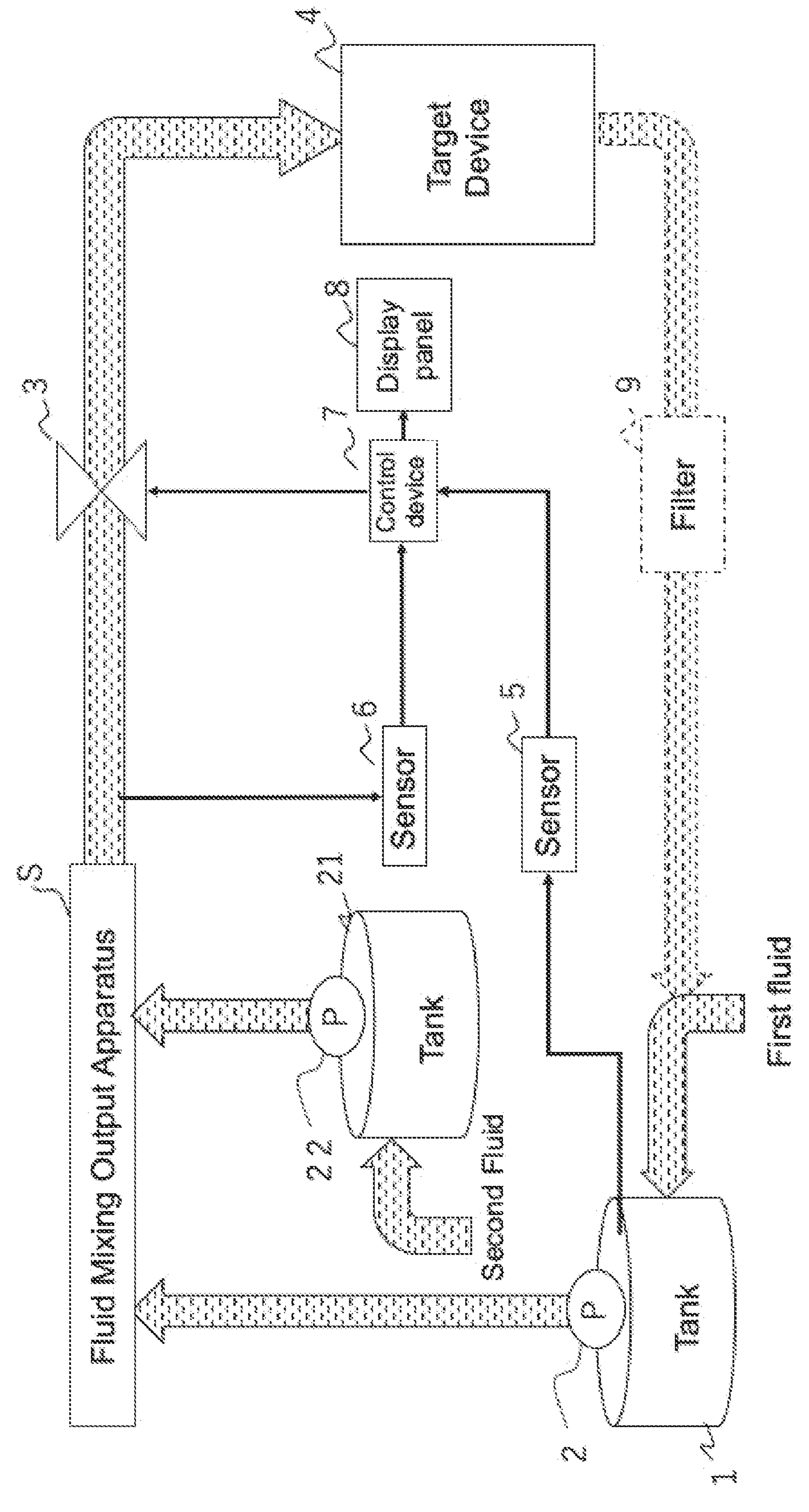
FIG. 1 is a diagram illustrating a utilization apparatus using a fluid mixing output apparatus of the present disclosure.

Hereinafter, a fluid utilization apparatus using a fluid mixing output apparatus S of the present disclosure is described. Reference numeral 1 denotes a tank (a water tank) for storing a first fluid (e.g., water) while it is supplied from the outside. The fluid in the tank 1 is sucked in by a pump 2 and supplied to the fluid mixing output apparatus S through a pipe. Reference numeral 21 is a tank (or a cylinder, etc.) for storing a second fluid (e.g., a gas) while it is supplied from the outside. The second fluid of the tank 21 is sucked in by a pump 22 and supplied to the fluid mixing output apparatus S through a pipe. When the second fluid is air, the fluid mixing output apparatus S only needs to take in outside air. As such, the fluid mixing output apparatus S is supplied with two fluids (one is a liquid and the other is a gas). Of course, a third tank and a pump may be prepared to supply a third fluid (which may be a liquid or a gas) to the fluid mixing output apparatus S to mix the three kinds of fluids. Alternatively, in the fluid mixing output apparatus S, more kinds of fluids may be mixed. A plurality of fluids are appropriately mixed and supplied to a target device 4 via a valve 3 from the fluid mixing output apparatus S.

For example, when the first fluid from the tank 1 is water and the second fluid from the tank 2 is air, the fluid mixing output apparatus S directly generates ultra-fine bubbles (the inside of the bubble is mainly vaporized water) and generates a large amount of microbubbles (some of which may be ultra-fine bubbles) mainly containing air inside the bubbles by, for example, agitating/spreading or shearing the sucked air. The fluid mixing output apparatus S of the present disclosure may generate fine bubbles by boiling and vaporizing a fluid itself by reducing pressure, or may generate fine bubbles by precipitate a gas dissolved at room temperature in a fluid. In this way, in the fluid mixing output apparatus S, it is possible to generate ultrafine bubbles as well as microbubbles, and the utilization apparatus may use the fluid containing fine bubbles of various sizes. In addition, the fluid mixing output apparatus S may mix, stir/diffuse, or shear two or more fluids (liquid-to-liquid, liquid and gas, gas-to-gas, or gas-liquid mixed fluids).

Based on output of a sensor 5 that detects a state (water temperature, etc.) of the first fluid of the tank 1 or a sensor 6 that detects a state (flow rate, pressure, etc.) of the fluid passing through the fluid mixing output apparatus S, a control device 7 performs opening and closing control of the valve 3, and displays a control state clearly to an operator on a display panel 8. Further, the fluid via the valve 3 is supplied to the target device 4. Except in the case where the supply fluid is consumed in the target device 4, the fluid used in the target device 4 is filtered to remove foreign matter and impurities via a filter 9 (in some cases, a chiller) and then returned to the tank 1 (in some cases, after returning to its original temperature) when circulating and reusing the fluid.

The fluid from the fluid mixing output apparatus S of the present disclosure is used in various utilization apparatuses. For example, the utilization apparatus is a machine tool, and cools or cleans a machining part by discharging the fluid from the fluid mixing output apparatus S through a nozzle onto a workpiece or a blade such as a whetstone and a drill. Alternatively, the utilization apparatus may be a cleaning system on a production line (in particular, precision instruments) in a factory. As such, the supply fluid from the fluid mixing output apparatus S functions as a coolant or cleaning agent for the target device 4. In other words, the liquid containing the fine bubbles lowers surface tension of the fluid and improves its permeability, so that the fluid moves to small areas, improving a cooling effect and cleaning capacity. According to a cavitation phenomenon described below, when the air pressure in the liquid is less than a saturated vapor pressure, bubbles by water vapor generate when the liquid is water. This bubbles are made of negative pressure, and naturally disappears at a high pressure, causing a large impact at that time. This impact is used for cleaning to increase the cleaning capacity. Similarly, the utilization apparatus may be a bottle, container, or equipment cleaning device. Further, ozone is mixed as the second fluid from the tank 2 in the water from the tank 1, and characteristics are changed to ozone fine bubble water by the fluid mixing output apparatus S, and ozone bubble water is discharged to a target product in the target device 4. In this way, effects of deodorization, decolorization, and sterilization may be obtained. Ozone is decomposed into oxygen molecules, and OH radicals are generated in the process, which improves sterilization performance. Thus, the supply fluid from the fluid mixing output apparatus S is used, for example, as a disinfectant.

Further, as the utilization apparatus including the target device 4, there is a fluid system for such as a washbasin, bath, washing, and washing in the home, and the cleaning effect is expected. In this case, the tank 1 is unnecessary, and may be realized by passing tap water (the first fluid) supplied from a water pipe directly through the fluid mixing output apparatus S (the second fluid is air). Similarly, it may be applied to fluid systems that directly use the tap water in factories, offices, and stores. Alternatively, oxygen is mixed with water as the first fluid as the second fluid from the tank 2, and characteristics are changed to oxygen fine bubble water by the fluid mixing output apparatus S, which may be applied to fluid systems for water treatment in agriculture, fisheries or other fields. The liquid containing fine bubbles may be absorbed by organisms such as plants and fish, accelerating their growth rate. It is also used to clean food ingredients, such as rice, crops, and fish. Furthermore, it may be applied to water treatment systems such as purification of groundwater, well water, and contaminated water. Hydrogen, carbon dioxide, and other gases may mixed with water as the second fluid from the tank 2, and the fluid mixing output apparatus S may change characteristics into hydrogen fine bubble water, carbon dioxide fine bubble water, fine bubble water having other characteristics, or various functional water to use for various purposes.

In addition, the utilization apparatus including the target device 4 may be applied to a fluid system for heat exchange of heat emitted by various devices, and it is also possible to supply the fluid from the fluid mixing output apparatus S to such a heat exchanger to realize cooling or heating. The fluid from the fluid mixing output apparatus S (which includes fine bubbles and is expected to have an effect of temperature changes) is passed through a pipe in the heat exchanger in the target device 4. In the target device 4, the fluid passing through the heat exchanger returns to the original temperature in a chiller not illustrated and is circulated to the tank 1. In this way, the fluid supplied to the target device 4 functions as a heat transfer agent that realizes cooling or heating of the target device.

For a fluid system that consumes a specific fluid (and does not circulate the fluid for use), the tank 1 is used by appropriately replenishing it with the fluid. Such target devices are various manufacturing and production lines, and may use fluids from the fluid mixing output apparatus S for manufacture or production of various articles (food, drugs, emulsion fuels, etc.).

Another utilization apparatus may supply a mixed fluid of cement and water as the first fluid and carbon dioxide as the second fluid to the fluid mixing output apparatus S, mix carbon dioxide in the mixed water of cement and water, and in some cases, prepare a cement fluid mixed with a larger amount of carbon dioxide by finely bubbling it. By using this cement to build structures, carbon dioxide in the atmosphere may be reduced (carbon dioxide is injected into concrete and fixed).

As such, the gas supplied to the fluid mixing output apparatus S is any one of, but is not limited to, for example, air, oxygen, hydrogen, nitrogen, ozone, argon, helium, ammonia, carbon dioxide, chlorine, hydrogen chloride, hydrocarbon gas, and natural gas. The liquid supplied to the fluid mixing output apparatus is any one of, but is not limited to, water, seawater, oil, alcohol, chemicals, and a mixed fluid of cement and water.

In the present disclosure, the fluid mixing output apparatus S may be an apparatus that generates fine bubbles (microbubbles or ultra-fine bubbles) in a fluid, or stirs/diffuses or shears the fluid to change characteristics of the fluid, and includes a structure that is thought to cause a change in a connection structure between molecules of the fluid. In addition, a plurality of such internal structures may be arranged in series, arranged in parallel, and the like as a configuration of the fluid mixing output apparatus S.

First Embodiment

Figure 2:
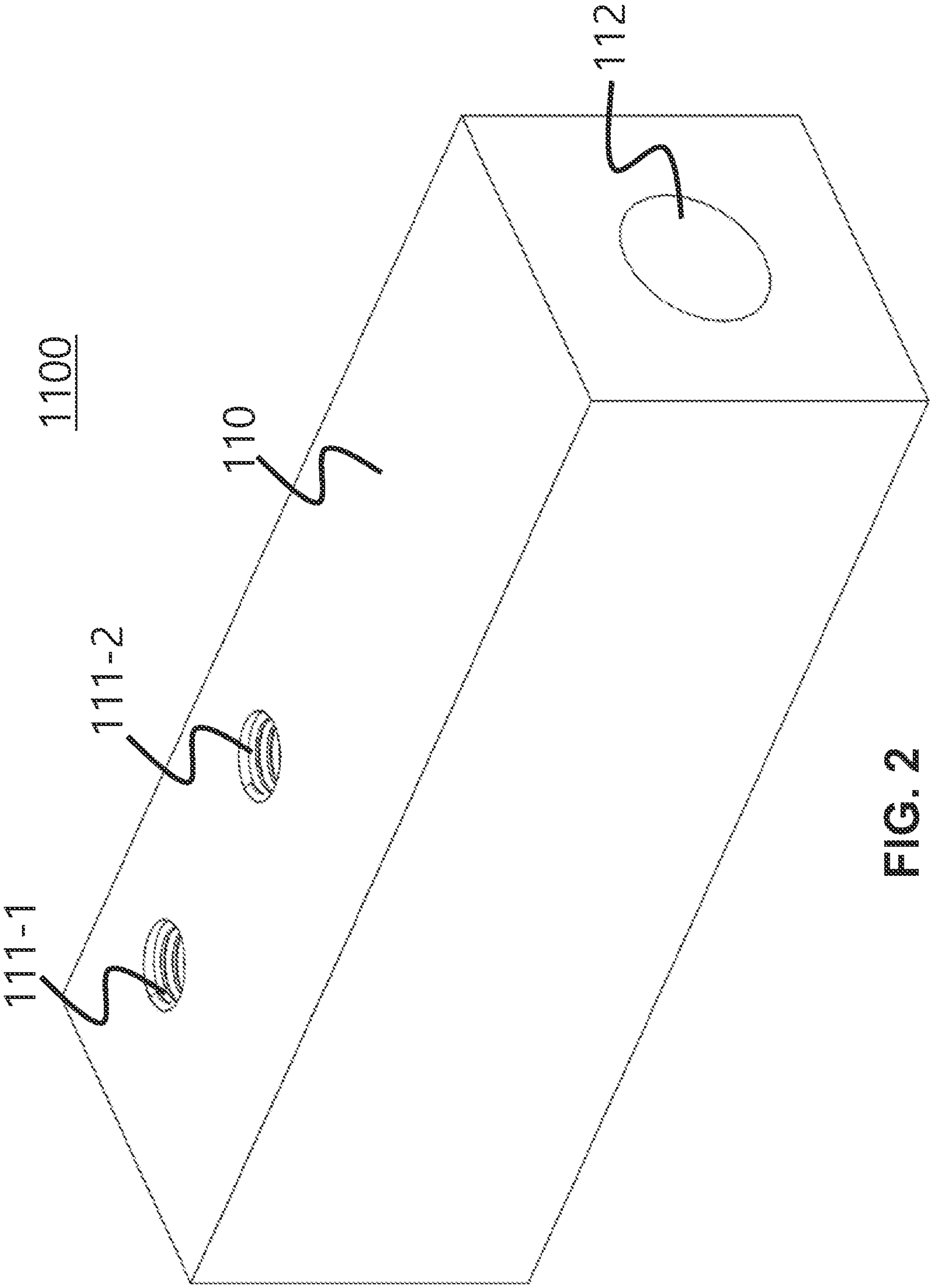
FIG. 2 is a three-dimensional perspective view of a fluid supply pipe for a first embodiment of a fluid mixing output apparatus of the present disclosure.
Figure 3:
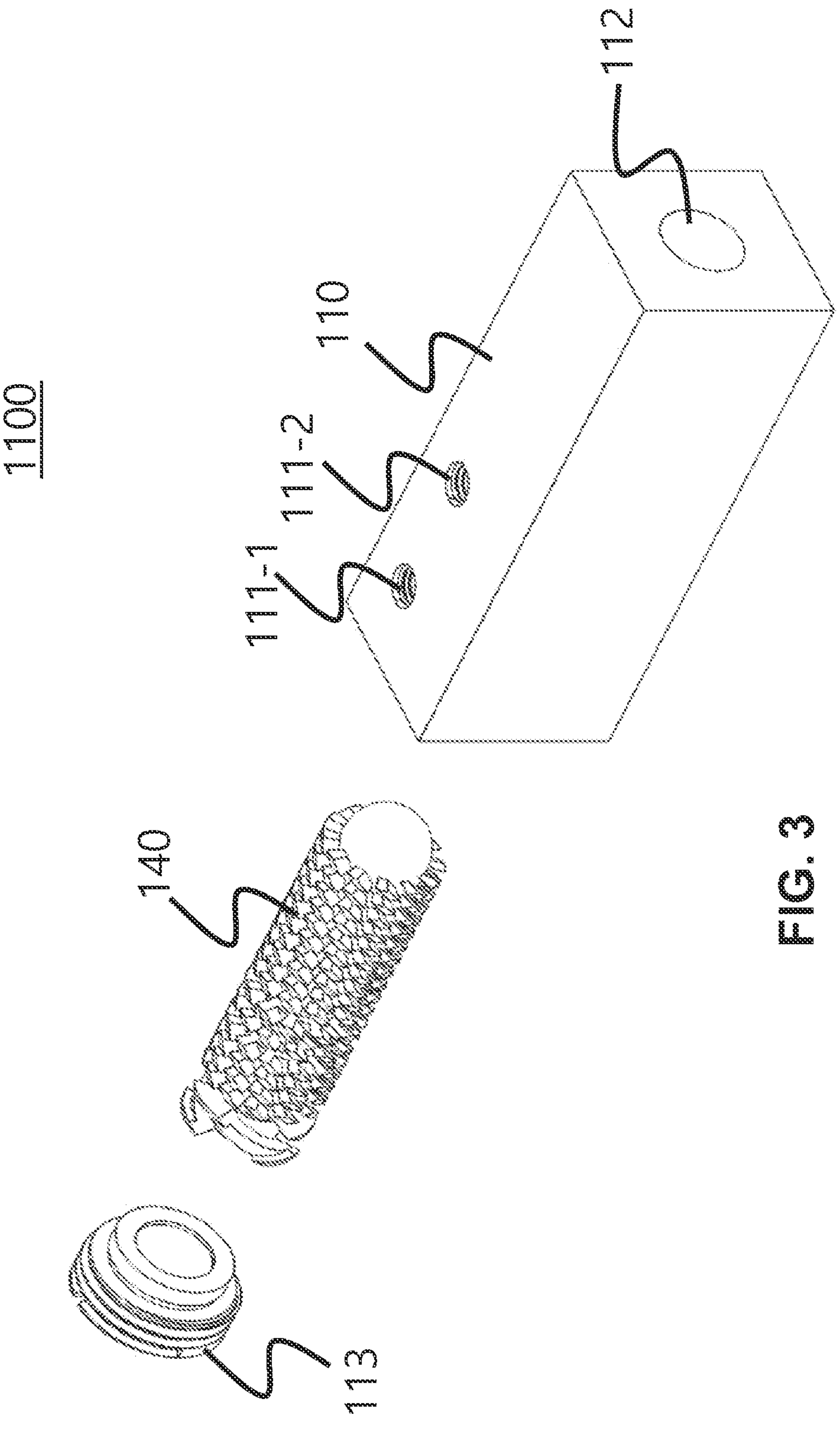
FIG. 3 is a three-dimensional exploded perspective view of the fluid supply pipe of FIG. 2.
Figure 4:
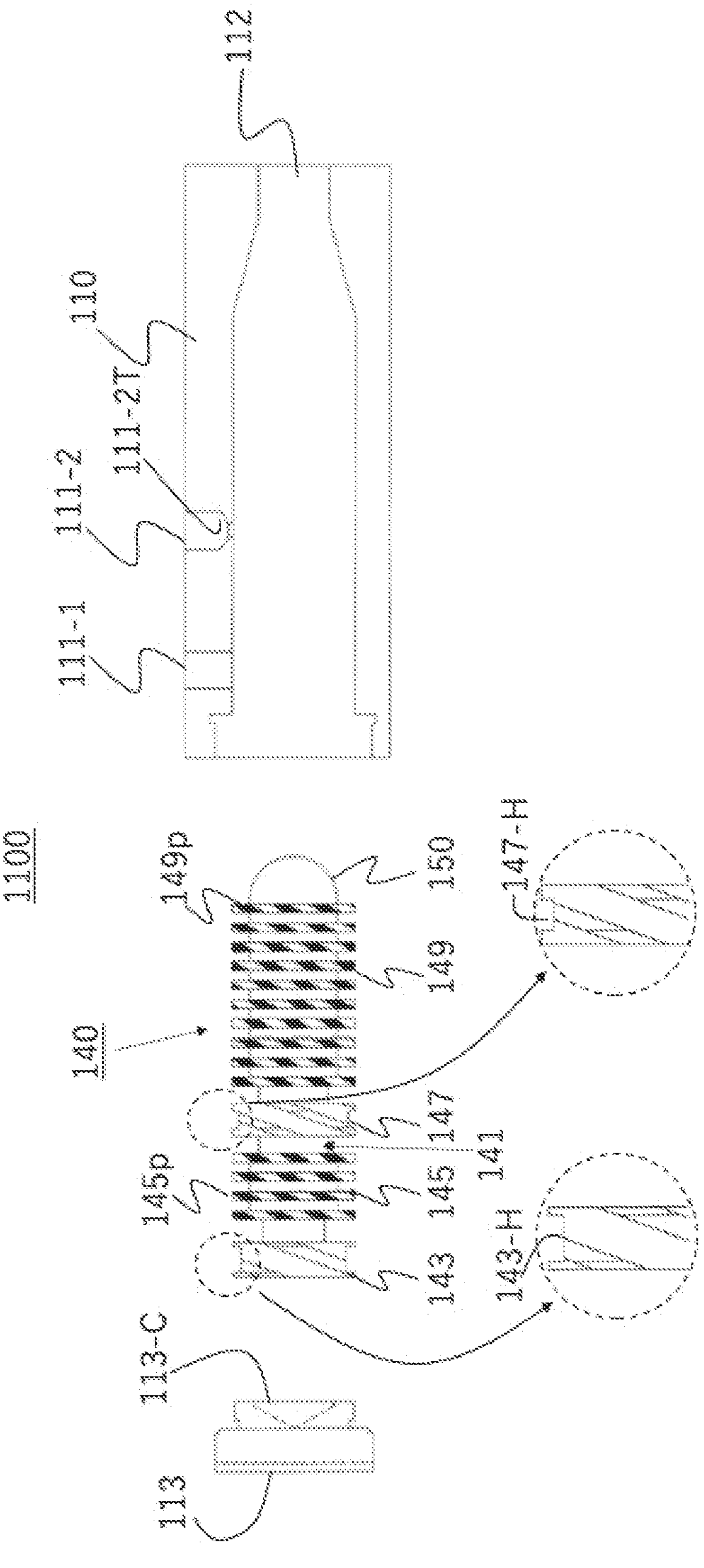
FIG. 4 is an exploded cross-sectional view of the fluid supply pipe of FIG. 2.

In a fluid supply pipe 1100 of an embodiment of the fluid mixing output apparatus S according to the present disclosure, there are two inlet systems that are fluid supply ports and one outlet system that is a fluid outlet so that two types of fluids can be mixed and output. FIG. 2 is a three-dimensional perspective view of the fluid supply pipe 1100 according to an embodiment of the fluid mixing output apparatus S of the present disclosure, FIG. 3 is a three-dimensional exploded perspective view of the fluid supply pipe 1100, FIG. 4 is an exploded cross-sectional view of the fluid supply pipe 1100, and FIG. 5 is a coupling cross-sectional view of the fluid supply pipe 1100 when the fluid supply joints (151-1, 151-2) are coupled on one side.

Figure 5:
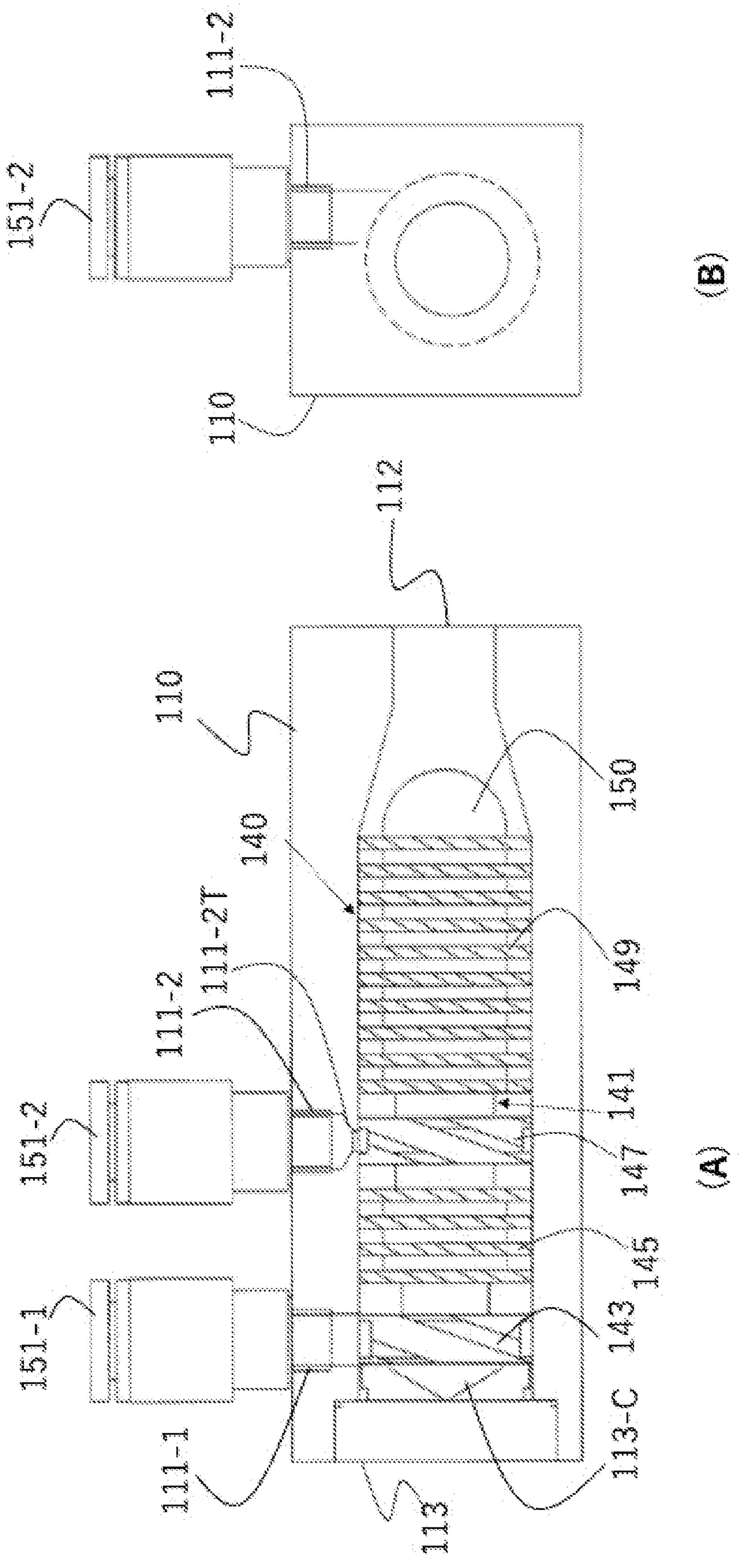
FIG. 5 is a coupling cross-sectional view when a fluid supply joint is coupled to the fluid supply pipe of FIG. 2.

(A) of FIG. 5 is a cross-sectional view viewed from the side, and (B) of FIG. 5 is a cross-sectional view viewed from the front of the output side.

As shown in these drawings, the fluid supply pipe 1100 includes a pipe body 110, an internal structure 140 disposed in the pipe body 110, and a lid 113 screwed to an upstream portion. The pipe body 110 is a pipe with a rectangular parallelepiped appearance and has a cavity therein shown in FIGS. 4 and 5. In other words, the internal cavity of the pipe body 110 consists of an upstream cavity in which a female thread (or male thread) threaded with a male thread (or female thread) of the lid 113 is cut, followed by a cylindrical cavity of a certain length of a large diameter, a cavity concentrically circular and tapered, and a cylindrical small-diameter cavity having a certain length at the final output end. In addition, the external shape of the pipe body 110 may be a cylindrical shape, a polygonal prism, or the like, in addition to a rectangular parallelepiped. This is similar in other embodiments.

The upstream end of the pipe body 110 becomes a circular opening in which a screw is formed, and one end of the upstream side is blocked by screw coupling with the screw formed in the lid 113. The upstream end is opened for cutting the cavity having the above-described shape, and is sealed by the lid 113 during actual use. In addition to screw coupling between the lid 113 and the pipe body 110, methods such as press-fitting or fitting of a lid member may also be employed, and methods such as adhesion or welding of the lid are also possible as long as fluid tightness is achieved. This is also similar in other embodiments of the present disclosure. The pipe body 110 is formed by a method of molding a plastic, or the like, in addition to a method of processing a prismatic member made of a metal such as steel. At the other end of the downstream side, an outlet 112 connected to the cylindrical small-diameter cavity is formed. Inside the lid 113, a conical cavity 113-C is formed. The fluid supply pipe 1100 is configured by inserting and fixing the internal structure 140 to the pipe body 110 from one end, and then closing one end with the lid 113.

As shown in FIG. 2, in this embodiment, fluid flows from two inlets 111-1 and 111-2 provided on one side and flows to the outlet 112 side. As shown in FIG. 5, the first fluid (e.g., liquid) is supplied to the first inlet 111-1 via the fluid supply joint 151-1, and the second fluid (e.g., gas) is supplied to the second inlet 11-2 via the fluid supply joint 151-2. Of course, for the first fluid and the second fluid, it is also possible to reverse the way in which the liquid and gas are supplied to the inlets 111-1 and 111-2. In this embodiment, the diameters of the inlet 111-1 and the inlet 111-2 are approximately the same, and they are on the same line, slightly deviating outwards from the center of one side of the pipe body 110 (see FIG. 2 and (B) of FIG. 5). This is because a slight lateral deviation from the center relative to the flow direction makes it easier to flow into the interior of the pipe body 110 (in the example of (B) of FIG. 5, a fluid flows while rotating counterclockwise as a whole). For example, as shown in FIGS. 4 and 5, while the inlet 111-1 of the fluid supply joint 151-1 for liquid supply has a straight cylindrical shape, the inlet 111-2 of the fluid supply joint 151-2 for gas is formed in a taper shape 111-2T that changes from a large diameter to a small diameter. Due to this shape, gas is injected from the inlet 111-2 under pressure in the internal cavity of the pipe body 110. In the conical cavity 113-C formed on the inner side of the lid 113, a portion of the first fluid inflowing from the inlet 111-1 is collected, but flows downstream due to the pressure of the fluid continuously injected from the fluid supply joint 151-1.

The internal structure 140 is formed by, for example, a method of cutting or grinding a cylindrical member made of a metal such as steel, a method of molding a plastic, or the like. Specifically, as shown in FIGS. 3 to 5, the internal structure 140 of the present embodiment includes a swirl generating portion 143 which is a first portion formed integrally on a common shaft member 141 having a circular cross-section, a bubble generating portion 145 which is a second portion, a swirl generating portion 147 which is a third portion, a swirl generating portion 147 which is a fourth portion, and a dome-shaped (or conical) guiding portion 150 located at the most downstream. In addition, a conical or dome-shaped diffusing portion is not shown, but may be added at the upstream end. This is also similar in other embodiments described below. In addition, downstream of the fourth portion, it is also possible to form a swirl generating portion which is a fifth portion, a bubble generating portion which is a sixth portion, and the like, in series in succession.

Each of the swirl generating portion 143, the bubble generating portion 145, the swirl generating portion 147, the bubble generating portion 149, and the guiding portion 150, or in addition thereto, the diffusing portion formed in the uppermost part is formed, for example, by processing a part of one cylindrical member. In this embodiment, the shaft member 141 includes the swirl generating portion 143 and the swirl generating portion 147 of small shaft diameters, and the bubble generating portion 145 and the bubble generating portion 149 of large shaft diameters. The difference in the shaft diameters is in consideration of the ease of flow of the fluid, and when an inflow (injection) pressure of the fluid into the pipe body 110 is set to high pressure, the swirl generating portion 143, the bubble generating portion 145, the swirl generating portion 147, and the bubble generating portion 149 may have the same diameter. Choice of the large or small shaft diameter of this shaft is also possible in other embodiments.

The swirl generating portion 143 has a circular cross-section, includes a shaft portion of a constant diameter, and a plurality, for example, three spirally formed vanes. As shown in FIGS. 4 and 5, in the present embodiment, the length of the flow direction of the swirl generating portion 143 is shorter than the length of the bubble generating portion 145. Each of the vanes of the swirl generating portion 143 is formed in a spiral shape in the counterclockwise direction at a predetermined interval on an outer circumferential surface of the shaft portion 141 from one end of the shaft portion 141 to the other end with a tip spaced apart by 120° from each other in the circumferential direction of the shaft portion 141. For example, when the number of vanes is four (4), they are formed 90° apart. The number or shape of the vanes of the swirl generating portion 143 is not particularly limited if the swirl generating portion 143 is capable of generating a swirling flow while the fluid entering the swirl generating portion 143 passes between each of the vanes. The swirl generating portion 143 has an outer diameter such that it is close to an inner circumferential surface of the cavity of the pipe body 110 when the internal structure 140 is accommodated in the pipe body 110. In addition, as shown enlarged in FIG. 4, at a location where the fluid supply port 111-1 of the housing 110 is provided, a recess 143-H is formed concentrically in the vane of the swirl generating portion 143. The recess 143-H, which is more concave than other portions, is formed so as not to impede injection of fluid.

The bubble generating portion 145 is formed downstream from the swirl generating portion 143. As shown in FIGS. 4 and 5, the bubble generating portion 145 includes a shaft portion 141 having a circular cross-section and a constant diameter and a plurality of protrusions (convex portions) 145*p* protruding from an outer circumferential surface of the shaft portion 141. In the bubble generating portion 145, the plurality of protrusions 145*p* are formed in a net shape and each of the plurality of protrusions 145*p* has a column shape having a rhombus-shaped cross-section. Each protrusion 145*p* is formed by, for example, grinding an outer circumferential surface of a cylindrical member so as to protrude outward in the radial direction from the surface of the shaft portion 141. More specifically, for example, according to a method of forming each protrusion 145*p*, a plurality of annular lines with predetermined spacing therebetween in the direction of 90 degrees with respect to the longitudinal direction of the cylindrical member and a plurality of spiral lines having a predetermined angle (for example, 60 degrees) with respect to the longitudinal direction with predetermined spacing therebetween are intersected with each other, and spaces between the annular lines in the direction of 90 degrees are ground alternately, and spaces between the tilted lines are ground alternately. In this way, the plurality of protrusions 145*p* protruding from the outer circumferential surface of the shaft portion 141 are formed regularly and alternately in the vertical direction (the circumferential direction of the shaft portion) and the horizontal direction (the longitudinal direction of the shaft portion 141-3). The groove bottom surface formed by grinding becomes the outer circumferential surface of the shaft portion 141. In addition, in the present embodiment, the outer diameter of the bubble generating portion 145 is such that it is close to the inner circumferential surface of the cavity of the pipe body 110 when the internal structure 140 is accommodated in the pipe body 110. In addition, the shape of the plurality of protrusions 145*p* may not be the rhombic protrusions as described above (for example, triangles, polygons, etc.), and their arrangements (angle, width, etc.) may be appropriately changed. These changes are equally applicable to other example embodiments. Further, in the above description, it has been explained that the protrusions 145*p* are formed by grinding, but by combining cutting and turning instead of grinding to form the protrusions 145*p*, time can be shortened. In addition, this processing method is applicable to protrusions 149*p* described later, and is also applicable to other example embodiments.

The swirl generating portion 147 is formed downstream from the bubble generating portion 145, as shown in FIGS. 4 and 5. The swirl generating portion 147 includes a shaft portion 141 with a circular cross-section and a constant diameter, and a plurality of, e.g., three vanes spirally formed, similar to the swirl generating portion 143. The length of the shaft portion 141 of the swirl generating portion 147 (the length with respect to the overall flow direction) is the same as the length of the shaft portion 141 of the swirl generating portion 143, but is not limited thereto. Adjustment of the length of the swirl generating portion 143 and the swirl generating portion 147 may be changed according to the characteristics of the fluid used. It is also possible to make the length of this shaft portion 141 longer or shorter than the length of the shaft portion 141 of the swirl generating portion 143, and this is also applicable to other example embodiments.

In this embodiment, the swirl generating portion 147 has an outer diameter such that it is close to an inner circumferential surface of the cavity of the pipe body 110 when the internal structure 140 is accommodated in the pipe body 110. As shown enlarged in FIG. 4, at a location where the fluid supply port 111-2 of the housing 110 is provided, a recess 147-H is formed in concentrically in the vane of the swirl generating portion 147. The recess 147-H, which is more concave than other portions, is formed so as not to impede injection of fluid. In consideration of the shape of the fluid supply port 111-2, as shown enlarged in FIG. 4, the width of a concave portion of the recess 147-H in the shaft direction is smaller than the width of a concave portion of the recess 143-H, but they may be formed to have the same width.

The bubble generating portion 149 is formed downstream from the swirl generating portion 147. Similarly to the bubble generating portion 145, the bubble generating portion 149 includes a shaft portion 141 with a circular cross-section and a constant diameter and a plurality of protrusions 149*p*, for example, having a rhombus-shaped cross-section, protruding from an outer peripheral surface of the shaft portion 141, and the plurality of protrusions 149*p* are formed in a net shape (see FIGS. 4 and 5). Each protrusion 149*p* is formed by grinding an outer circumferential surface of the cylindrical member, for example, so that it protrudes outward in a radial direction from the surface of the shaft portion 141. The protrusion 149*p* may be formed in the same manner as the protrusion 145*p* of the bubble generating portion 145. In addition, in the present embodiment, the bubble generating portion 149 has an outer diameter such that it is close to an inner circumferential surface of the cavity of the pipe body 110 when the internal structure 140 is accommodated in the pipe body 110.

In the present embodiment, the length of the shaft portion 141 of the bubble generating portion 149 is longer than the length of the shaft portion 141 of the bubble generating portion 145. In other words, the number of the protrusions 149*p* of the bubble generating portion 149 is greater than the number of the protrusions 145*p* of the bubble generating portion 145. However, the present disclosure is not limited to this embodiment. The length of the shaft portion 141 of the bubble generating portion 149 in the overall flow direction may be equal to the length of the shaft portion 141 of the bubble generating portion 145. However, in general, by making the length of the shaft portion 141 of the bubble generating portion 149 in the entire flow direction longer than the length of the shaft portion 141 of the bubble generating portion 145, the mixing effect of the fluids is increased.

The guiding portion 150 is formed, for example, by processing an end portion of the downstream side of the cylindrical member into a dome. As described below, by inducing the fluid flowing through the inside of the fluid supply pipe 1100 towards the center of the pipe by the guiding unit 150, the fluid can be smoothly discharged through the outlet 112. In another embodiment, the internal structure 140 does not include an induction portion. Alternatively, the internal structure 140 includes a conical guiding portion.

Hereinafter, flow of the fluid passing through the fluid supply pipe 1100 will be described. The first fluid (e.g., liquid) is supplied to the inlet 111-1 via the fluid supply joint 151-1, and the second fluid (e.g., gas) is supplied to the inlet 111-2 via the fluid supply joint 151-2. The first fluid inflowing through the inlet 111-1 passes between the three vanes formed in the spiral shape of the swirl generating portion 143 as a part thereof gathers in the conical cavity 113-C formed on the inner side of the lid 113. At this time, the recess 143-H is formed concentrically in the vane of the swirl generating portion 143 and the vane does not impede injection of the first fluid. The fluid is sent to the bubble generating portion 145 through the shaft portion 141 as an intense swirling flow by each vane of the first swirl generating portion 143.

The fluid then passes between the plurality of protrusions 145*p* of the bubble generating portion 145. These plurality of protrusions 145*p* form a plurality of narrow flow paths (intersecting flow paths of spiral flow paths and the annular flow paths). When the fluid passes through the plurality of narrow flow paths formed by the plurality of protrusions 145*p*, a large number of minute vortices are generated. In other words, mixing and diffusion of the fluids are induced by a phenomenon of repeated collision and diversion of the spiral flow paths with a steep flow and the annular flow paths with a gentle flow. The above-described structure of the first bubble generating portion 145 is also useful for mixing two or more fluids having different properties.

In addition, the internal structure 140 has a structure that allows the fluid to flow from the upstream side (swirl generating portion 143) with a large cross-sectional area to the downstream side with a small cross-sectional area (flow paths formed between the plurality of protrusions 145*p* of the bubble generating portion 145). This structure changes the static pressure of the fluid as described below. The relationship between pressure, velocity, and potential energy with no external energy to a fluid is given by the Bernoulli equation.

$$p+\frac{\rho v^2}{2}+gh\rho=k \qquad \text{[Equation 1]}$$

Here, p is the pressure at a point on a streamline, p is the density of the fluid, b is the fluid flow velocity at the point, g is the gravitational acceleration, h is the height of the point with respect to a reference plane, and k is a constant. The Bernoulli's law expressed as the above equation is the energy conservation law applied to fluids and explains that the sum of all the forms of energy on a streamline is constant for flowing fluids at all times. According to the Bernoulli's law, the fluid velocity is low and the static pressure is high in the upstream side having the large cross-sectional area. On the other hand, the fluid velocity is increased and the static pressure is lowered in the downstream side having the small cross-sectional area.

In the case that the fluid is a liquid, the liquid begins to vaporize when the lowered static pressure reaches the saturated vapor pressure of the liquid. Such a phenomenon in which a liquid is rapidly vaporized because the static pressure becomes lower than the saturated vapor pressure (for water, 3000 to 4000 Pa) in extremely short time at almost constant temperature is called cavitation. The internal structure of the fluid supply pipe 1100 of the present disclosure causes this cavitation phenomenon. Due to the cavitation phenomenon, the liquid is boiled with minute bubbles of a particle size less than 100 microns existing in the liquid as nuclei or many minute bubbles are generated due to isolation of dissolved gas. In other words, many fine bubbles are generated while the fluid passes the bubble generating portion 145.

In the case of water, one water molecule can form hydrogen bonds with four other water molecules, and this hydrogen bonding network is not easy to break down. Therefore, the water has much higher boiling point and melting point than other liquids that do not form hydrogen bonds, and is highly viscous. Since the water having the high boiling point exhibits an excellent cooling effect, the water is frequently used as the coolant for the machine tool for performing operations such as grinding. However, the water has a problem that the size of the water molecule is large and its penetration to a machining spot and/or lubricity is not so good. Thus, conventionally, a special lubricant (i.e. cutting oil) other than the water is frequently used alone or mixed with the water. In the case of using the fluid supply pipe of the present disclosure, the cavitation phenomenon described above causes vaporization of the water and, as a result, the hydrogen bonding network of the water is destroyed to lower the viscosity. Further, the fine bubbles generated by the vaporization reduce the surface tension of the water, thereby improving permeability and lubrication. The improved penetration results in increased cooling efficiency. Therefore, according to the present disclosure, it is possible to improve machining quality (i.e. the performance of the machine tool) even if only water is used without using a special lubricant.

The fluid passing through the bubble generating portion 145 passes through the shaft portion 141 and between the three spiral-formed vanes of the swirl generating portion 147. At this time, the second fluid (gas) inflowing from the fluid supply joint 151-2 through the inlet 111-2 is injected between the three vanes spirally formed of the swirl generating portion 147. The recess 147-H is formed in the vane of the swirl generating portion 147 and the vane does not impede injection of the second fluid supplied through the fluid supply joint 151-2. Here, while the second fluid is mixed with the first fluid from upstream, the mixed fluid consisting of the first and second fluids becomes an intense swirling flow by each vane of the second swirl generating portion 147 and is sent through the shaft portion 141 to the bubble generating portion 149.

In the bubble generating portion 149, as described with respect to the bubble generating portion 145, the fluid passes through a plurality of narrow flow paths formed by the plurality of protrusions 149*p*, and thus a phenomenon of generating a plurality of minute vortices occurs. In the case that the second fluid is a gas, it is possible to micronize the particle size of the gas by passing through these thin flow paths. In addition, the cavitation phenomenon occurs due to the structure in which the fluid flows from a large cross-sectional flow path (a flow path formed by the three vanes of the swirl generating portion 147) to flow paths with a small cross-sectional area (flow paths formed between the plurality of rhombic protrusions 149*p* of the bubble generating portion 149). As a result, as the fluid passes through the bubble generating portion 149, a large number of fine bubbles are generated.

As described above, the fluid supply pipe 1100 of the present embodiment is configured such that the first fluid passing through the swirl generating portion 143 and the bubble generating portion 145 is mixed with the second fluid injected from the inlet 111-2 via the fluid supply joint 151-2 and they become a spiral flow by the spirally formed vanes of the swirl generating portion 147 and pass through thin intersecting flow paths between the plurality of protrusions 149*p* of the bubble generating portion 149. By generating the swirling flow by the swirl generating portion 147 provided upstream of the bubble generating portion 149 and supplying it to the second bubble generating portion 149, the effect of fine bubble generation in the first fluid may be increased compared to the case of having one bubble generating portion 145. In addition, the second fluid is also micronized and mixed with the first fluid, increasing the possibility (frequency) that the mixed fluid is also fine-bubbled.

The fluid passing through the bubble generating portion 149 flows towards the end of the internal structure 140. The flow path rapidly widens in a space between the guiding portion 150 and the tapered portion inside the tube body 110 from the plurality of narrow flow paths of the bubble generation unit 149. At this time, a Coanda effect is generated by the conical curved surface of the guiding portion 150 of the internal structure 140. The Coanda effect is the phenomenon in which a fluid flowing around a curved surface is drawn to the curved surface due to a pressure drop between the fluid and the curved surface and thus the fluid flows along the curved surface. Due to the Coanda effect, the fluid is induced to flow along the surface of the guiding portion 150. The fluid guided toward the center of the pipe by the guiding portion 150 of the internal structure 140 flows out through the outlet 112.

In the first embodiment described above, one of the plurality of fluid supply ports of the pipe body 110 which is the housing is formed in the portion (inlet 111-1) corresponding to the vane of the swirl generating portion 143, which is the first portion of the internal structure 140, and the supplied first fluid becomes a swirling flow and is supplied to the bubble generating portion 145 which is the second portion. Another one of the plurality of fluid supply ports is formed in the portion corresponding to the vane of the swirl generating portion 147 (inlet 111-2), which is the third portion, and the second fluid is supplied to the third portion and then supplied to the bubble generating portion 149, which is the fourth portion as a swirling flow while being mixed with the first fluid supplied from the second portion.

Here, while the swirl generating portion 143 and the swirl generating portion 147 of the internal structure 140 generate counterclockwise swirling flows (vortex flows), both of them may generate clockwise swirling flows (vortex flows). Accordingly, the spiral flow paths of the bubble generating portion 145 and the bubble generating portion 149 may be clockwise. In addition, the inlets (111-1 and 111-2) shown in (B) of FIG. 5 are also biased to the left side (right from the direction of the overall flow) from the center of the drawing so that it is easy for the fluid to rotate clockwise. This is also applicable other example embodiments below.

Second Embodiment

Next, a second embodiment of the fluid mixing output apparatus S related to the present disclosure will be described. A fluid supply pipe 2100 of the present embodiment includes three inlet systems that are fluid supply ports and one outlet system that is a fluid outlet so that three or more types of fluids can be mixed and output. In addition, one input system can divide into three directions to introduce fluid. Therefore, the same type of fluid may be supplied to the inputs of the two systems. Further, the entrance of one system divided into three directions may be supplied with different fluids for respective directions. In addition, while the number of directions of the entrance is 3, it may be increased to 4, or decreased to 1 or 2. In particular, when injecting a gas, it is efficient to inject by dispersing from a plurality of inlets, so that a required amount can be mixed into the liquid without applying high pressure, and the gas can be mixed homogeneously and without forming large bubbles.

Figure 6:
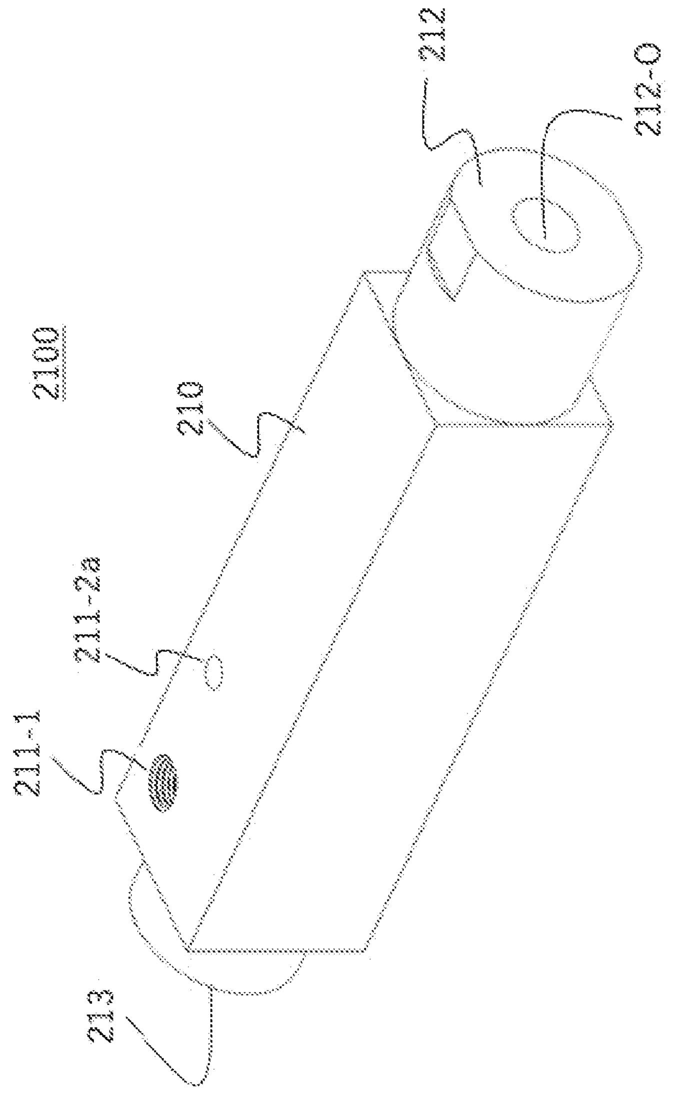
FIG. 6 is a three-dimensional perspective view of a fluid supply pipe for a second embodiment of a fluid mixing output apparatus of the present disclosure.
Figure 7:
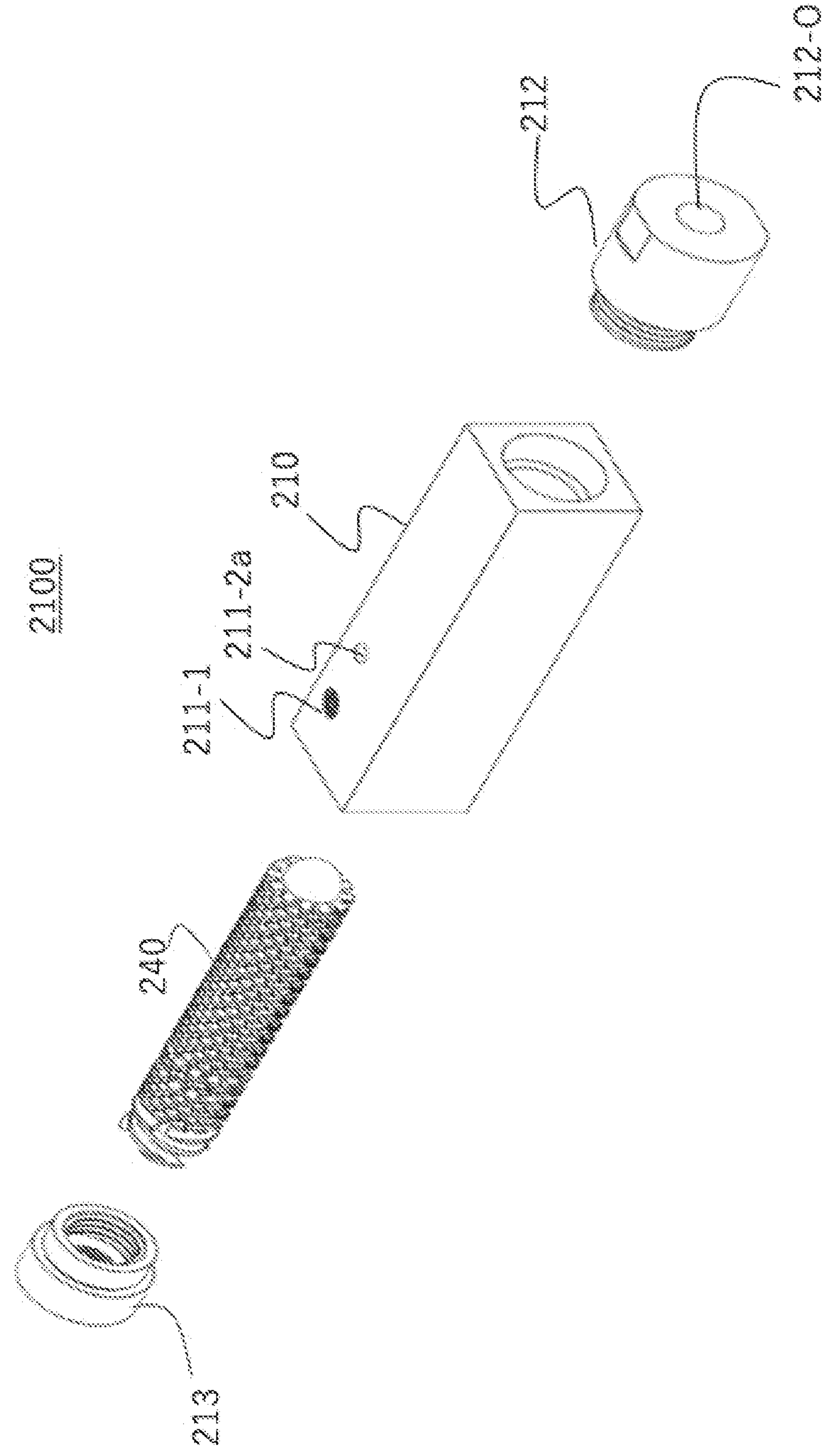
FIG. 7 is a three-dimensional exploded perspective view of the fluid supply pipe of FIG. 6.
Figure 8:
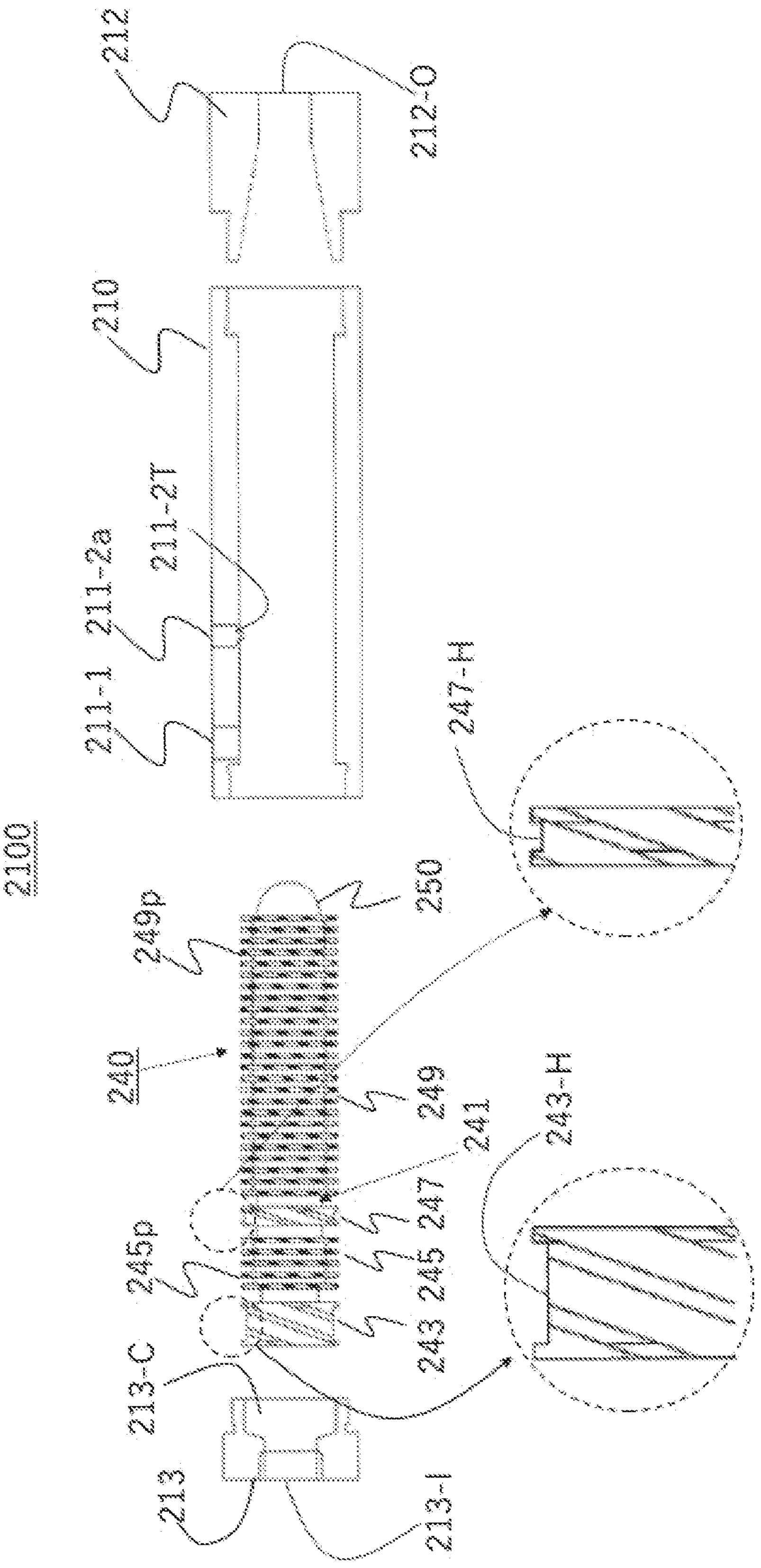
FIG. 8 is an exploded cross-sectional view of the fluid supply pipe of FIG. 6.
Figure 9:
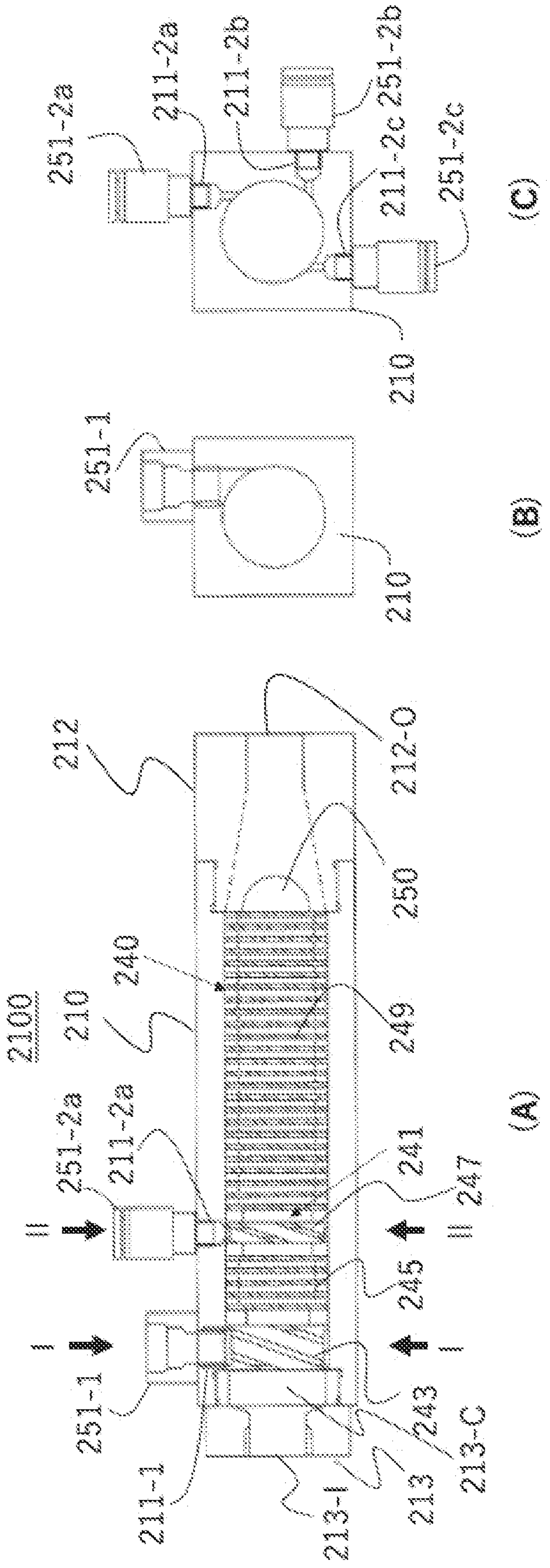
FIG. 9 is a coupling cross-sectional view when a fluid supply joint is coupled to the fluid supply pipe of FIG. 6.

FIG. 6 is a three-dimensional perspective view of the fluid supply pipe 2100, FIG. 7 is a three-dimensional exploded perspective view of the fluid supply pipe 2100, FIG. 8 is an exploded cross-sectional view of the fluid supply pipe 2100, and FIG. 9 is a coupling cross-sectional view of the fluid supply pipe 2100 when a fluid supply joint 251-1 from one direction and fluid supply joints (251-2*a* to 251-2*c*) from three directions are coupled. (A) of FIG. 9 is a cross-sectional view viewed from the side, (B) of FIG. 9 is a cross-sectional view of the position I, and (C) of FIG. 9 is a cross-sectional view of the position II. As shown in these drawings, the fluid supply pipe 2100 is a pipe with a rectangular parallelepiped appearance and includes a pipe body 210 having a substantially cylindrical cavity thereinside shown in FIGS. 8 and 9, an input side coupling body 213, and an output side coupling body 212. In the internal cavity of the pipe body 210, the internal structure 240 may be arranged and fixed.

The pipe body 210 is formed by a method of processing a prismatic member made of a metal such as steel, a method of molding a plastic, or the like. The upstream end of the pipe body 210 is, for example, a circular opening in which a female thread (or male thread) is formed, and is threaded and coupled with a male thread (or female thread) formed in the input side coupling body 213. A female thread is formed at the downstream end of the pipe body 210, and is screwed and coupled with a male thread of the output side coupling body 212 in which the outlet is formed. In the input side coupling body 213, an inlet 213-I and a substantially cylindrical cavity 213-C are formed. In the output side coupling body 212, a tapered outlet 212-0 with a small diameter is formed. The fluid supply pipe 2100 is assembled by inserting and fixing the internal structure 240 into the pipe body 210 from one end, installing the input side coupling body 213 at one end of the upstream side, and installing the output side coupling body 212 at the other side of the downstream side. In addition, the coupling between the pipe body 210, the input side coupling body 213, and the output side coupling body 212 may take other coupling forms such as a fit in addition to the screws.

In FIG. 9, a first fluid (e.g., a liquid) inflows from the opening 213-I (a first system) of the input side coupling body 213, a second fluid (e.g., a liquid) inflows from an inlet 211-1 (a second system) provided on one side from the fluid supply joint 251-1, and a third fluid (e.g., a gas) inflows from inlets (211-2*a* to 211-2*c*) (a third system) provided on three sides from the fluid supply joints (251-2*a* to 251-2*c*), and they flow toward the output side coupling body 212 with the outlet. The fluid supply ports 211-2*a* to 211-2*c* of the third fluid are provided at corresponding positions on a concentric circle of the swirl generating portion 247 of a third portion of a shaft portion of the internal structure 240.

Compared with the diameter of the inlet 211-1, the diameter of each of the inlets 211-2*a* to 211-2*c* formed on the three sides is slightly smaller. This is because when the fluid is a gas, the diameter of the inlet is reduced and pressure is applied to inject the fluid, so that large bubbles do not form in the gas. Similar to the first embodiment, in order to facilitate inflow, the inlet 211-1 and the inlets 211-2*a* to 211-2*c* are collinear slightly deviated from the center of each side of the pipe body 210, as shown in FIGS. 6 and 7, and (C) of FIG. 9. Each of the inlets 211-2*a* to 211-2*c* of the fluid supply joint 251-2 for gas has a tapered shape 211-2T that injects the gas by applying pressure by narrowing the lower side, and an injection port at the end is narrow.

Similar to the configuration described in the first embodiment, as shown in FIGS. 7 to 9, the internal structure 240 includes a swirl generating portion 243 that is a first portion integrally formed on a common shaft member 241 having a circular cross-section, a bubble generating portion 245 that is a second portion, a swirl generating portion 247 that is a third portion, a bubble generating portion 249 that is a fourth portion, and a dome-shaped (or cone-shaped) guiding portion 250 located at the most downstream. In addition, a conical or dome-shaped diffusing portion for diffusing fluid from the center to the periphery may be added to the upstream end of the internal structure 240.

Each of the swirl generating portion 243, the bubble generating portion 245, the swirl generating portion 247, the bubble generating portion 249, and the guiding portion 250, or the diffusing portion at the upstream end is formed, for example, by processing a portion of one cylindrical member. In the present embodiment, as in the first embodiment, the shaft member 241 has the swirl generating portion 243 and the swirl generating portion 247 with small shaft diameters, and the bubble generating portion 245 and the bubble generating portion 249 with large shaft diameters. In another embodiment, the swirl generating portion 243, the bubble generating portion 245, the swirl generating portion 247, and the bubble generating portion 249 have the same diameter.

The swirl generating portion 243 includes a shaft portion with a circular cross-section and a constant diameter and a plurality of vanes. Further, the vanes of this swirl generating portion 243 have the shape as shown and enlarged in FIG. 8. In other words, at the position where the fluid supply port 211-1 of the pipe body 210 is installed, a recess 243-H that is more concave than other portions is formed concentrically, and is formed so as not to impede fluid injection.

The bubble generating portion 245 is formed downstream from the swirl generating portion 243. The bubble generating portion 245 includes a shaft portion 241 having a circular cross-section and a constant diameter, and a plurality of protrusions (convex portions) 245*p* protruding from an outer circumferential surface of the shaft portion 241. In the bubble generating portion 245, the plurality of protrusions 245*p*, each having a column shape and having a diamond-shaped cross-section, are formed in a net shape. Since this structure, function, and formation method are the same as the first embodiment, descriptions thereof will be omitted.

The swirl generating portion 247 is formed downstream from the bubble generating portion 145, as shown in FIGS. 8 and 9. The swirl generating portion 247 includes a shaft portion 241 with a circular cross-section and a constant diameter, and a plurality of vanes, similarly to the swirl generating portion 243. The length of the shaft portion 241 of the swirl generating portion 247 in the overall flow direction is shorter than the length of the shaft portion of the swirl generating portion 243. This is the case where the lengths of the flow direction are different for the liquid (supplied to the swirl generating portion 243) and the gas (supplied to the swirl generating portion 247), but is not limited thereto, and the lengths may be the same. The vanes of this swirl generating portion 247 are enlarged and shown in FIG. 8. In other words, at a location where the fluid supply port (211-2*a* to 211-2*c*) of the housing 210 is provided, a recess 247-H, which is more concave than other portions, is formed concentrically and is formed so as not to impede injection of fluid.

The bubble generating portion 249 is formed downstream from the swirl generating portion 247. Similar to the bubble generating portion 245, the bubble generating portion 249 includes a shaft portion 241 with a circular cross-section and a constant diameter, and a plurality of rhombic protrusions 249*p* protruding from an outer circumferential surface of the shaft portion 241. The plurality of rhombic protrusions 249*p* are formed in a net shape. Since this shape and function are similar to the first embodiment, detailed descriptions thereof will be omitted.

The guiding portion 250 is formed, for example, by machining the end of the downstream side of the cylindrical member into a domed or conical shape. The fluid flowing through the inside of the fluid supply pipe 2100 is guided toward the center of the pipe by the guiding portion 250, so that the fluid may be smoothly discharged through the outlet 212-0 of the output side coupling body 212.

Flow during fluid passage through fluid supply pipe 2100 will be described. The first fluid (e.g., liquid) is supplied from the opening 213-I (first system) of the input side coupling body 213 and becomes a swirling flow by the swirl generating portion 243 via the cavity 213-C, wherein the second fluid (e.g., liquid) from the fluid supply joint 251-1 is supplied from the inlet 211-1 (second system) provided on one side, and the first fluid and the second fluid are mixed while turning and supplied to the bubble generating portion 245. In the bubble generating portion 245, a phenomenon of generating a large number of minute vortices occurs for the mixed flow of the first fluid and the second fluid. The Cavitation phenomenon occurs by a structure in which the fluid flows from a large cross-sectional flow path (a flow path formed by the vanes of the swirl generating portion 243) to a flow path with a small cross-sectional area (intersecting flow paths formed between the plurality of rhombic protrusions 245*p* of the bubble generating portion 245). As a result, as the fluid passes through the bubble generating portion 245, a plurality of fine bubbles are generated.

The fluid passing through the bubble generating portion 245 passes between the spirally-formed vanes of the swirl generating portion 247. In this case, the third fluid (e.g., gas) inflowing through the inlets 211-2*a* to 211-2*c* from the fluid supply joints 251-2*a* to 251-2*c* is injected between the spirally formed vanes of the swirl generating portion 247. At this time, the recess 247-H is formed in the vane of the swirl generating portion 247, so as not to impede injection of the third fluid supplied through the fluid supply joints 251-2*a* to 251-2*c*. Here, as the third fluid is mixed into the mixed fluid of the first and second fluids coming from upstream, the mixed fluid consisting of the first to third fluids is sent to the bubble generating portion 249 as an intense swirling flow by each vane of the swirl generating portion 247. As shown in (C) of FIG. 9, the direction of the supply of the fluid from the fluid supply joints 251-2*a* to 251-2*c* is also in the direction of accelerating the counterclockwise rotation of the fluid, and each of them is at an angle rotated relative to the direct direction.

As described with respect to the bubble generating portion 245, the bubble generating portion 249 also generates a plurality of minute vortices as the fluid passes through the plurality of narrow flow paths formed by the plurality of protrusions 249*p*. If the third fluid is a gas, the particle size of the gas is micronized by passing through these narrow flow paths. In addition, the Cavitation phenomenon occurs by a structure in which the fluid flows from a large cross-sectional flow path (a flow path formed by the three vanes of the swirl generating portion 247) to a flow path with a small cross-sectional area (intersecting flow paths formed between the plurality of rhombic protrusions 249*p* of the bubble generating portion 249). As a result, as the fluid passes through the bubble generating portion 249, a number of fine bubbles are generated.

As described above, according to the second embodiment, one of the plurality of fluid supply ports of the fluid supply pipe 2100 that is a housing is the opening 213-I of the upstream end of the input side coupling body 213, wherein the first fluid is supplied to the swirl generating portion 243 that is the first portion, and another one of the plurality of fluid supply ports is formed in the portion 211-1 corresponding to the vane of the swirl generating portion 243 that is the first portion of the pipe body 210 that is the housing, wherein the second fluid is supplied and mixed with the first fluid and supplied as a swirling flow to the bubble generating portion 245 that is the second portion. Still another one of the plurality of fluid supply ports is formed in the portions (211-2*a* to 211-2*c*) corresponding to the vanes of the swirl generating portion 245 that is the third portion of the pipe body 210, which is the housing, and the third fluid is supplied to the swirl generating portion 247 that is the third portion, and is further mixed with the mixed fluid of the first fluid and the second fluid supplied from the second portion and supplied to the bubble generating portion 249 that is the fourth portion as a swirling flow. By generating the swirling flow by the swirl generating portion 247 provided upstream from the bubble generating portion 249 and supplying it to the second bubble generating portion 249, the effect of generating fine bubbles in the mixed fluid of the first and second fluids may be increased compared to the case where only one bubble generating portion 245 is provided. In addition, the third fluid is also micronized and mixed with the mixed fluid consisting of the first and second fluids, and the first to third mixed fluids are also likely to be fine-bubbled.

Third Embodiment

A third embodiment of the fluid mixing output apparatus S of the present disclosure will be described. The fluid supply pipe 3100 of the present embodiment includes two systems of inlet and one system of outlet so that two or more types of fluids can be mixed and output. In addition, one input system can be divided into four directions to introduce fluids. At the entrance of one system divided into four directions, a separate fluid may be supplied in each direction. In addition, while the number of directions of the entrance is 4, it may be increased to 5 or more, or decreased to 1, 2, or 3. Similar to the second embodiment, especially when injecting gases, distributed injection from multiple inlets is efficient because it allows the required amount to be mixed into the liquid without applying high pressure, and allows the gas to be mixed homogeneously without forming large bubbles.

Figure 10:
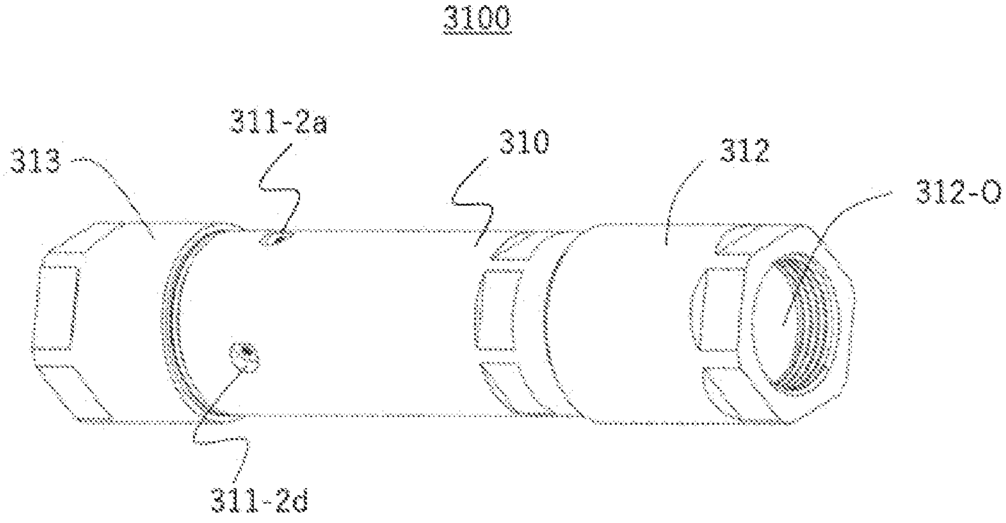
FIG. 10 is a three-dimensional perspective view of a fluid supply pipe for a third embodiment of a fluid mixing output apparatus of the present disclosure.
Figure 11:
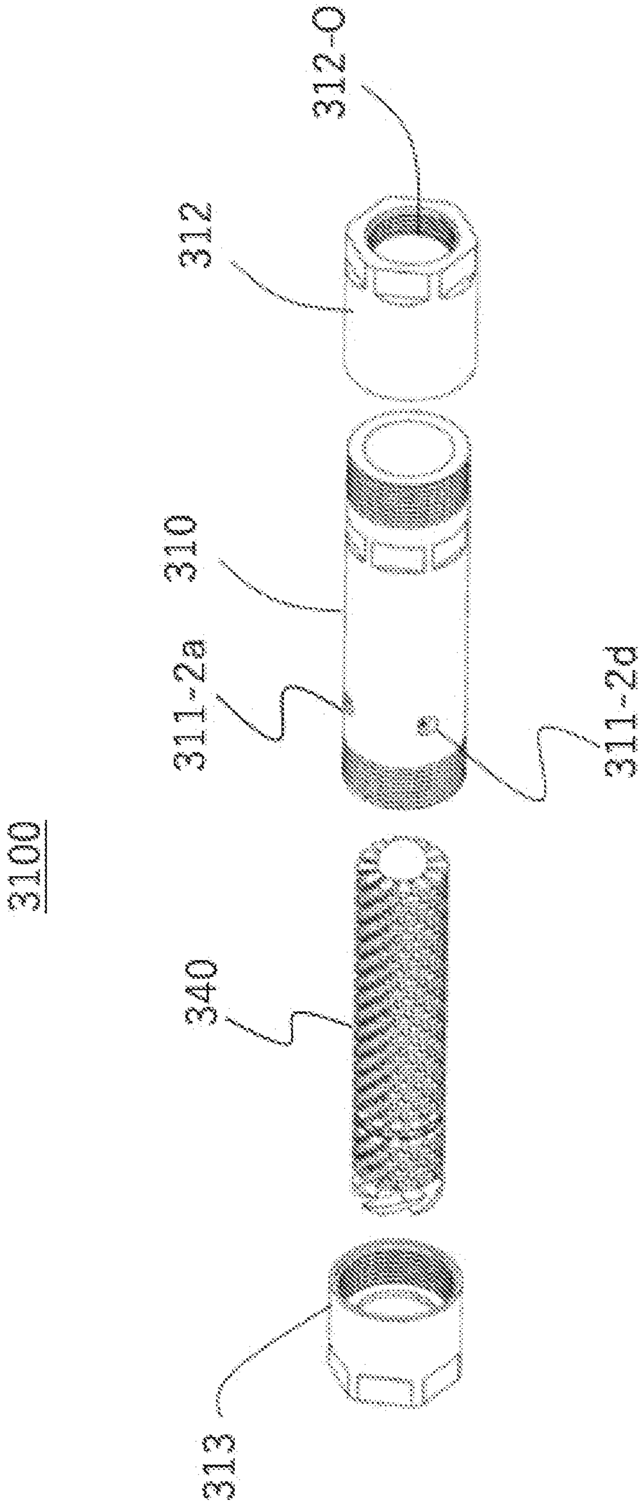
FIG. 11 is a three-dimensional exploded perspective view of the fluid supply pipe of FIG. 10.
Figure 12:
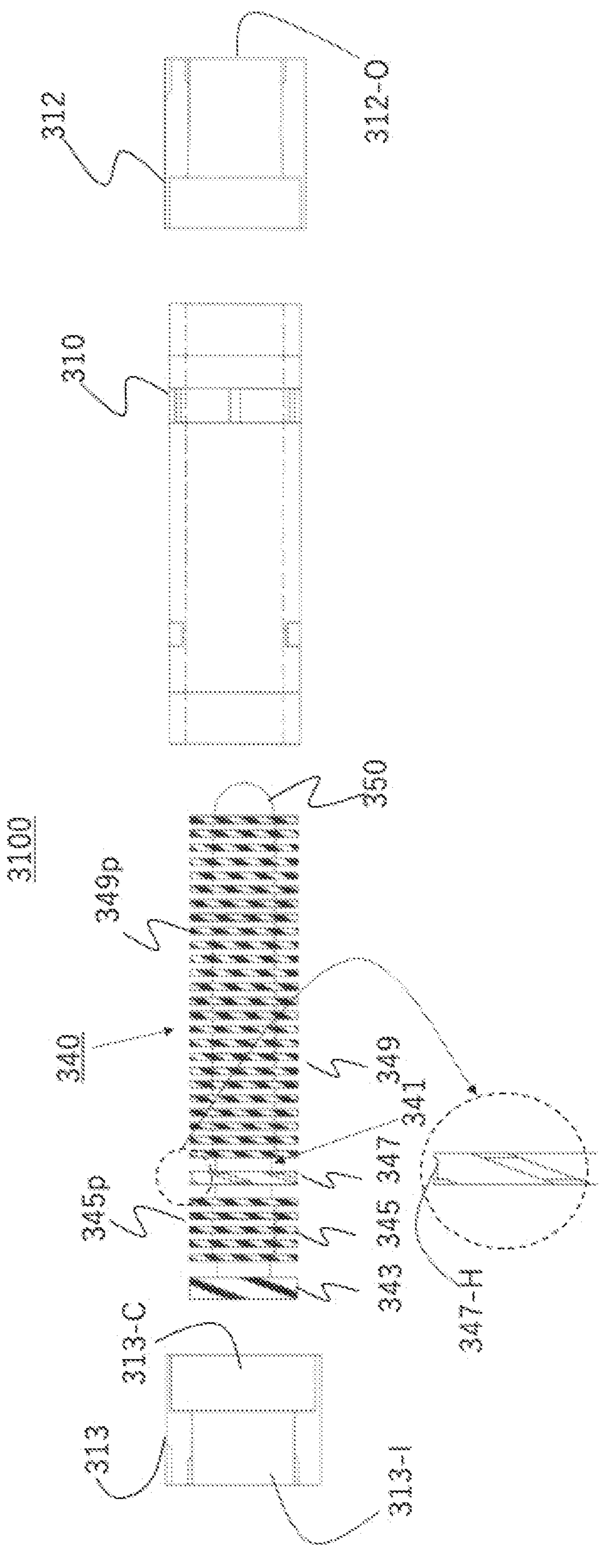
FIG. 12 is an exploded cross-sectional view of the fluid supply pipe of FIG. 10.
Figure 13:
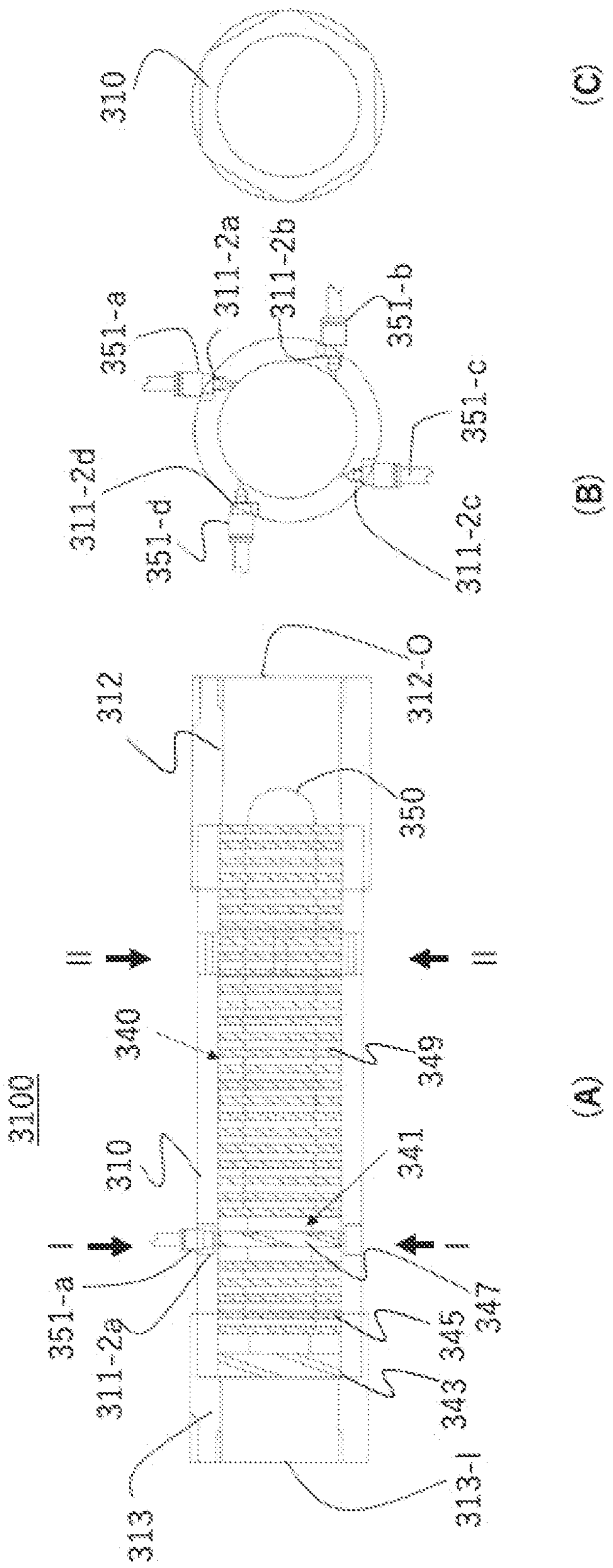
FIG. 13 is a coupling cross-sectional view when a fluid supply joint is coupled to the fluid supply pipe of FIG. 10.

FIG. 10 is a three-dimensional perspective view of the fluid supply pipe 3100, FIG. 11 is a three-dimensional exploded perspective view of the fluid supply pipe 3100, FIG. 12 is an exploded cross-sectional view of the fluid supply pipe 3100, and FIG. 13 is a coupling cross-sectional view of the fluid supply pipe 3100 when fluid supply joints 351-*a* to 351-*d* are coupled from four directions. (A) of FIG. 13 is a cross-sectional view viewed from the side, (B) of FIG. 13 is a cross-sectional view of the position I, and (C) of FIG. 13 is a cross-sectional view of position II. As shown in these drawings, the fluid supply pipe 3100 is a cylindrical pipe and includes a pipe body 310 whose interior is a substantially cylindrical cavity as shown in FIGS. 12 and 13, an input side coupling body 313, and an output side coupling body 312. Inside the pipe body 310, an internal structure 340 is accommodated and fixed.

The pipe body 310 is formed by a method of processing a prismatic member made of a metal such as steel, a method of molding a plastic, or the like. The upstream end of the pipe body 310 is, for example, a circular opening in which a male thread (or female thread) is formed, and is screwed and coupled with a female thread (or male thread) formed in the input side coupling body 313. A male thread (or female thread) is formed at the downstream end of the pipe body 310, and is screwed and coupled with a female thread (or female thread) of the output side coupling body 312. In the input side coupling body 313, an inlet 313-I and a substantially cylindrical cavity 313-C are formed, and an outlet 312-0 is formed in the output side coupling body 312. In the fluid supply pipe 3100, after inserting and fixing the internal structure 340 from one end to the pipe body 310, the input side coupling body 313 is installed at one end of the inflow side, and the output side coupling body 312 is installed and assembled at the other end of the outflow side. When the fluid supply pipe 3100 is assembled, the swirl generating portion 343, that is a first portion of the internal structure 340 described below, is located at the location of the cavity 313-C of the input side coupling body 313, and a guiding portion 350 of the internal structure 340 is located in the internal cavity of the output side coupling body 312. The coupling method of the pipe body 340, the input side coupling body 313, and the output side coupling body 312 may be changed in various ways such as fitting in addition to thread as in the first and second embodiments.

In FIG. 13, a first fluid (e.g., liquid) inflows from the opening 313-I of the input side coupling body 313, and a second fluid (e.g., gas) inflows via the fluid supply joints 351-*a* to 351-*d*, from the inlets 311-2*a* to 311-2*d* provided on four sides and flows toward the output side coupling body 312 with the outlet 312-0.

Similar to the configurations described with respect to the first and second embodiments, the internal structure 340 includes a swirl generating portion 343 that is a first portion, a swirl generating portion 345 that is a second portion, a swirl generating portion 347 that is a third portion, a bubble generating portion 349 that is a fourth portion, and a dome-shaped (or conical) guiding portion 350 located at the most downstream, formed integrally on a common shaft member 341 having a circular cross-section. In addition, a conical or dome-shaped diffusing portion may be added to the upstream end.

Each of the swirl generating portion 343, the bubble generating portion 345, the swirl generating portion 347, the bubble generating portion 349, and the guiding portion 350 or the diffusing portion is formed, for example, by processing a portion of one cylindrical member. In the present embodiment, as in the first and second embodiments, the shaft member 341 has the swirl generating portion 343 and the swirl generating portion 347 having small shaft diameters, and the bubble generating portion 345 and the bubble generating portion 349 having large shaft diameters. In another embodiment, the swirl generating portion 343, the bubble generating portion 345, the swirl generating portion 347, and the bubble generating portion 349 have shaft members of the same diameter.

The swirl generating portion 343 includes a shaft portion having a circular cross-section and a constant diameter and a plurality of vanes. The bubble generating portion 345 is formed downstream from the swirl generating portion 343. The bubble generating portion 345 includes a shaft portion 341 having a circular cross-section and a constant diameter, and a plurality of protrusions (convex portions) 345*p* protruding from an outer circumferential surface of the shaft portion 341. In the bubble generating portion 345, the plurality of protrusions 345*p*, each having a rhombus-shaped cross-section, are formed in a net shape. Since this structure, function, and formation method are the same as those of the first and second embodiments, descriptions thereof will be omitted.

The swirl generating portion 347 is formed downstream from the bubble generating portion 345, as shown in FIGS. 12 and 13. The swirl generating portion 347 includes a shaft portion 341 with a circular cross-section and a constant diameter, and a plurality of vanes, similarly to the swirl generating portion 343. The length of the shaft portion 341 of the swirl generating portion 347 (the length of the overall flow direction) is shorter than the length of the shaft portion of the swirl generating portion 343. This is the case when the lengths of the flow direction are different for a liquid (supplied from the opening 313-I of the input side coupling body 313 to the swirl generating portion 343) and a gas (supplied via the fluid supply joints 351-*a* to 351-*d* to the swirl generating portion 347) (the length for the gas is shorter than the length for the liquid), but is not limited thereto, and the lengths may be the same. As shown enlarged in FIG. 12, at a location where the fluid supply port (311-2*a* to 311-2*d*) of a housing 310 is provided, a recess 347-H is formed concentrically in the vane of the swirl generating portion 347. The recess 347-H, which is more concave than other portions, is formed so as not to impede injection of fluid.

The bubble generating portion 349 is formed downstream from the swirl generating portion 347. Similar to the bubble generating portion 345, the bubble generating portion 349 includes a shaft portion 341 having a circular cross-section and a constant diameter, and a plurality of protrusions 349*p* protruding from an outer circumferential surface of the shaft portion 341, and the plurality of protrusions 349*p* are formed in the form of a net. Since this shape and function are the same as those of the first and second embodiments, detailed descriptions thereof will be omitted.

The guiding portion 350 is formed, for example, by machining the end of the downstream side of the cylindrical member into a dome-shaped or conical shape. The fluid flowing through the inside of the fluid supply pipe 3100 is guided toward the center of the pipe by the guiding portion 350, so that the fluid can be smoothly discharged through the outlet 312-0 of the output side coupling body 312.

Flow during fluid passage through fluid supply pipe 3100 will be described. The first fluid (e.g., liquid) is supplied from the opening 313-I (first system) of the input side coupling body 313, and becomes a swirling flow by the swirl generating portion 343 and is supplied to the bubble generating portion 345. In the bubble generating portion 345, a phenomenon of generating a large number of minute vortices occurs for the first fluid. The Cavitation phenomenon occurs due to a structure in which the fluid flows from a flow path having a large cross-sectional area (a flow path formed by the vanes of the swirl generating portion 343) to a flow path having a small cross-sectional area (intersecting flow paths formed between the plurality of protrusions 345*p* of the bubble generating portion 345). As a result, a large number of fine bubbles are generated while the fluid passes through the bubble generating portion 345.

The fluid passing through the bubble generating portion 345 passes between the spirally-formed vanes of the swirl generating portion 347. At this time, the second fluid (e.g., gas) inflowing through the inlets (311-2*a* to 311-2*d* is) injected between the spirally formed vanes of the swirl generating portion 347. At this time, the recess 347-H is formed in the vane of the swirl generating portion 347, so as not to impede the injection of the second fluid supplied through the fluid supply joints (351-*a* to 351-*d*). Here, the first and second fluids coming from upstream are mixed, and the mixed fluids consisting of the first and second fluids become an intense swirling flow by each vane of the swirl generating portion 347 and are sent to the bubble generating portion 349. As shown in (B) of FIG. 13, the direction of the supply of the fluid from the fluid supply joints 351-*a* to 351-*d* is also in the direction of accelerating the counter-clockwise rotation of the fluid, and each of them is at an angle rotated in the direct direction.

As described with respect to the bubble generating portion 345, in the bubble generating portion 349, a large number of minute vortices are generated when the fluid passes through a plurality of narrow flow paths formed by the plurality of protrusions 349*p*. If the second fluid is a gas, it is possible to micronize the particle size of the gas by passing through these thin flow paths. In addition, the cavitation phenomenon occurs due to the structure in which the fluid flows from a large cross-sectional flow path (a flow path formed by the three vanes of the swirl generating portion 347) to a flow path with a small cross-sectional area (intersecting flow paths formed between the plurality of rhombic protrusions 349*p* of the bubble generating portion 349). As a result, as the fluid passes through the bubble generating portion 349, a large number of fine bubbles are generated.

As described above, according to the third embodiment, one of the plurality of fluid supply ports of the housing is the opening 313-I of the upstream end of the fluid supply pipe 3100 that is the housing, wherein the first fluid is supplied to the bubble generating portion 345 that is a second portion as a swirling flow, and another one of the plurality of fluid supply ports is formed in the portion (311-2*a* to 311-2*d*) corresponding to the vane of the swirl generating portion 347 that is a third portion of the pipe body 340, which is the housing wherein the second fluid is supplied to the third portion and is supplied as a swirling flow while being mixed with the first fluid supplied from the second portion to the bubble generating portion 349 that is a fourth portion. By generating a swirling flow by the swirl generating portion 347 provided upstream from the bubble generating portion 349 and supplying it to the second bubble generating portion 349, the effect of generating fine bubbles in the first fluid may be increased compared to the case where only one bubble generating portion 345 is provided. In addition, the second fluid is also micronized, increasing the possibility (frequency) that the first and second mixed fluids are also micronized.

Although the present invention has been described using a plurality of embodiments, the present invention is not limited to such examples. A person skilled in the art to which the present disclosure pertains may conceive many variations and other embodiments of the present invention from the above description and related drawings. In the present specification, a plurality of specific terms are used, but they are used in a general sense only for illustrative purposes and not for the purpose of limiting the invention. Various modifications are possible within the range that does not escape the general concept and ideas of the invention defined by the appended claims and their equivalents.

EXPLANATION OF SYMBOLS

S Fluid mixing output apparatus
4 Target device
1100, 2100, 3100 Fluid supply pipe
111-1, 111-2, 211-1, 211-2*a*-211-2*c*, 311-2*a*~311-2*d* Inlet
140, 240, 340 Internal structure
143, 147, 243, 247, 343, 347 Swirl generating portion
143-H, 147-H, 243-H, 247-H, 347-H Recess
145, 149, 245, 249, 345, 349 Bubble generating portion

151-1, 151-2, 251-1, 251-2A-251-2C, 351-A~351-D Fluid supply joint

213-I, 313-I Opening

What is claimed is:

1. A fluid mixing output apparatus comprising:

a housing; and an internal structure accommodated in the housing, wherein the housing is provided with a plurality of fluid supply ports for supplying at least a first fluid and a second fluid and a fluid outlet at its downstream end for outputting a plurality of fluids after mixing the plurality of fluids, and the internal structure comprises a first portion, a second portion, a third portion, and a fourth portion, wherein the first portion comprises a shaft portion and a vane spirally formed to generate a swirling flow in a fluid, the second portion is located downstream from the first portion, and comprises a shaft portion and a plurality of protrusions protruding from an outer circumferential surface of the shaft portion, the third portion is located downstream from the second portion, and comprises a shaft portion and a vane spirally formed to generate a swirling flow in a fluid, and the fourth portion is located downstream from the third portion, and comprises a shaft portion and a plurality of protrusions protruding from an outer circumferential surface of the shaft portion, and wherein one of the plurality of fluid supply ports of the housing is formed by opening an upstream end and/or in a portion corresponding to the vane of the first portion, and at least the first fluid is supplied to the first portion and supplied to the second portion as a swirling flow, and one of the plurality of fluid supply ports of the housing is formed in a portion corresponding to the vane of the third portion, and the second fluid is supplied to the third portion and supplied to the fourth portion as a swirling flow while being mixed with at least the first fluid.

2. The fluid mixing output apparatus of claim 1, wherein one or a plurality of fluid supply ports of the second fluid of the housing formed in the portion corresponding to the vane of the third portion are provided in one or a plurality of corresponding positions on a concentric circle of the third portion of the shaft portion of the internal structure.

3. The fluid mixing output apparatus of claim 1, wherein at a location where the fluid supply port of the housing is provided, the vane of the third portion is concentrically recessed compared to other portions and is formed so as not to impede injection of the second fluid.

4. The fluid mixing output apparatus of claim 1, wherein at a location where the fluid supply port of the housing is provided, the vane of the first portion is concentrically recessed compared to other portions and is formed so as not to impede injection of the first fluid.

5. The fluid mixing output apparatus of claim 1, wherein the internal structure comprises the first portion, the second portion, the third portion, and the fourth portion which are integrally formed on a common shaft member having a circular cross-section.

6. The fluid mixing output apparatus of claim 1, wherein each of the first portion and the third portion of the internal structure comprises a plurality of vanes, and a tip of each of the vanes is spaced apart from each other at a predetermined angle in a circumferential direction of the shaft portion.

7. The fluid mixing output apparatus of claim 1, wherein the plurality of protrusions of the second portion and the plurality of protrusions of the fourth portion of the internal structure are formed in a net shape, and each protrusion has a column shape.

8. The fluid mixing output apparatus of claim 1, wherein the internal structure further comprises a guiding portion at the downstream end configured to guide a mixed fluid toward a center of flow.

9. The fluid mixing output apparatus of claim 5, wherein a diameter of the shaft portion of the first portion of the internal structures is less than a diameter of the shaft portion of the second portion of the internal structures.

10. The fluid mixing output apparatus of claim 5, wherein a diameter of the shaft portion of the third portion of the internal structures is less than a diameter of the shaft portion of the fourth portion of the internal structures.

11. The fluid mixing output apparatus of claim 1, wherein the number of the protrusions of the second portion of the internal structure is less than the number of the protrusions of the fourth portion of the internal structure.

12. The fluid mixing output apparatus of claim 1, characterized in that one of the plurality of fluid supply ports of the housing is formed in a portion corresponding to the vane of the first portion, and the first fluid is supplied to the first portion and supplied to the second portion as a swirling flow, and one of the plurality of fluid supply ports of the housing is formed at an upstream end, and a fluid which is the same as or different from the first fluid is supplied from upstream to the first portion.

13. A fluid utilization apparatus comprising a fluid mixing output apparatus, wherein the fluid mixing output apparatus comprises:

a housing; and an internal structure accommodated in the housing, wherein the housing is provided with a plurality of fluid supply ports for supplying at least a first fluid and a second fluid and a fluid outlet at its downstream end for outputting a plurality of fluids after mixing the plurality of fluids, and the internal structure comprises a first portion, a second portion, a third portion, and a fourth portion, wherein the first portion comprises a shaft portion and a vane spirally formed to generate a swirling flow in a fluid, the second portion is located downstream from the first portion, and comprises a shaft portion and a plurality of protrusions protruding from an outer circumferential surface of the shaft portion, the third portion is located downstream from the second portion, and comprises a shaft portion and a vane spirally formed to generate a swirling flow in a fluid, and the fourth portion is located downstream from the third portion, and comprises a shaft portion and a plurality of protrusions protruding from an outer circumferential surface of the shaft portion, wherein one of the plurality of fluid supply ports of the housing is formed by opening an upstream end and/or in a portion corresponding to the vane of the first portion, and at least the first fluid is supplied to the first portion and supplied to the second portion as a swirling flow, and one of the plurality of fluid supply ports of the housing is formed in a portion corresponding to the vane of the third portion, and the second fluid is supplied to the third portion and supplied to the fourth portion as a swirling flow while being mixed with at least the first fluid, and wherein the fluid utilization apparatus is configured to supply a liquid as the first fluid and a gas as the second fluid to the fluid mixing output apparatus and output the first and second fluids in a state where the gas is mixed in the liquid from the fluid outlet of the housing to use in a gas-liquid mixed state.

14. A fluid utilization apparatus comprising a fluid mixing output apparatus, wherein the fluid mixing output apparatus comprises:

a housing; and an internal structure accommodated in the housing, wherein the housing is provided with a plurality of fluid supply ports for supplying at least a first fluid and a second fluid and a fluid outlet at its downstream end for outputting a plurality of fluids after mixing the plurality of fluids, and the internal structure comprises a first portion, a second portion, a third portion, and a fourth portion, wherein the first portion comprises a shaft portion and a vane spirally formed to generate a swirling flow in a fluid, the second portion is located downstream from the first portion, and comprises a shaft portion and a plurality of protrusions protruding from an outer circumferential surface of the shaft portion, the third portion is located downstream from the second portion, and comprises a shaft portion and a vane spirally formed to generate a swirling flow in a fluid, and the fourth portion is located downstream from the third portion, and comprises a shaft portion and a plurality of protrusions protruding from an outer circumferential surface of the shaft portion, wherein one of the plurality of fluid supply ports of the housing is formed by opening an upstream end and/or in a portion corresponding to the vane of the first portion, and at least the first fluid is supplied to the first portion and supplied to the second portion as a swirling flow, and one of the plurality of fluid supply ports of the housing is formed in a portion corresponding to the vane of the third portion, and the second fluid is supplied to the third portion and supplied to the fourth portion as a swirling flow while being mixed with at least the first fluid, and wherein the fluid utilization apparatus is configured to supply a liquid as the first fluid and a gas as the second fluid to the fluid mixing output apparatus and output the first and second fluids in a state where the gas is mixed in the liquid from the fluid outlet of the housing to use in a gas-liquid mixed state.

15. The fluid utilization apparatus of claim 13, wherein the gas supplied to the fluid mixing output apparatus is any one of air, oxygen, hydrogen, nitrogen, ozone, argon, helium, ammonia, carbon dioxide, chlorine, hydrogen chloride, hydrocarbon gas, and natural gas.

16. The fluid utilization apparatus of claim 13, wherein liquid supplied to the fluid mixing output apparatus is any one of water, seawater, oil, alcohol, chemical liquid, and a mixed fluid of cement and water.

17. The fluid utilization apparatus of claim 13, wherein the gas supplied to the fluid mixing output apparatus is air, and the liquid supplied is water, and the fluid utilization apparatus use a fluid output from the fluid outlet for cooling and cleaning after promoting generation of fine bubbles of the air or the water by the second portion and the fourth portion of the internal structure of the fluid mixing output apparatus to change fluid characteristics.

18. The fluid utilization apparatus of claim 13, wherein the gas supplied to the fluid mixing output apparatus is carbon dioxide, and the liquid supplied is a mixed fluid of water and cement, and the fluid utilization apparatus promotes generation of fine bubbles of the carbon dioxide and mixes the bubbles into the mixed fluid of water and cement.

19. The fluid utilization apparatus of claim 14, wherein the gas supplied to the fluid mixing output apparatus is any one of air, oxygen, hydrogen, nitrogen, ozone, argon, helium, ammonia, carbon dioxide, chlorine, hydrogen chloride, hydrocarbon gas, and natural gas.

20. The fluid utilization apparatus of claim 14, wherein liquid supplied to the fluid mixing output apparatus is any one of water, seawater, oil, alcohol, chemical liquid, and a mixed fluid of cement and water.

* * * * *